(12) United States Patent
Ando et al.

(10) Patent No.: US 8,777,696 B2
(45) Date of Patent: Jul. 15, 2014

(54) PROCESSING METHOD FOR CONCAVE-CONVEX GEAR

(75) Inventors: Yoshiaki Ando, Chiryu (JP); Masayuki Takeshima, Okazaki (JP); Ikuko Hirota, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 144 days.

(21) Appl. No.: 13/578,729

(22) PCT Filed: Feb. 10, 2011

(86) PCT No.: PCT/JP2011/052834
§ 371 (c)(1),
(2), (4) Date: Aug. 13, 2012

(87) PCT Pub. No.: WO2011/099545
PCT Pub. Date: Aug. 18, 2011

(65) Prior Publication Data
US 2012/0309272 A1 Dec. 6, 2012

(30) Foreign Application Priority Data

Feb. 12, 2010 (JP) ................................. 2010-029177

(51) Int. Cl.
*B23F 15/00* (2006.01)
(52) U.S. Cl.
USPC ................................... 451/47; 409/26; 409/1
(58) Field of Classification Search
USPC ......... 451/47; 409/1, 26; 29/90.6, 893, 893.3, 29/893.35
See application file for complete search history.

(56) References Cited

U.S. PATENT DOCUMENTS

| | | | | |
|---|---|---|---|---|
| 1,639,624 A | * | 8/1927 | Woltzendorff | 409/38 |
| 2,315,147 A | * | 3/1943 | Wildhaber | 409/51 |
| 2,372,240 A | * | 3/1945 | Wildhaber | 409/26 |

(Continued)

FOREIGN PATENT DOCUMENTS

| JP | 58 57544 | 4/1983 |
|---|---|---|
| JP | 1 229165 | 9/1989 |

(Continued)

OTHER PUBLICATIONS

International Search Report Issued Apr. 19, 2011 in PCT/JP11/052834 Filed Feb. 10, 2011.

(Continued)

*Primary Examiner* — Lee D Wilson
*Assistant Examiner* — Tyrone V Hall, Jr.
(74) *Attorney, Agent, or Firm* — Oblon, Spivak, McClelland, Maier & Neustadt, L.L.P.

(57) ABSTRACT

A relative movement trajectory of each convex tooth pin of a mating gear with respect to a concave-convex gear at the time when torque is transmitted between the mating gear and the concave-convex gear (nutation gear) may be expressed by a first linear axis, a second linear axis, a third linear axis, a fourth rotation axis, a fifth rotation axis and a sixth indexing axis. Then, a relative movement trajectory of each convex tooth pin of the mating gear, expressed by the first linear axis, the second linear axis, the third linear axis, the fifth rotation axis and the sixth indexing axis in the case where the fourth rotation axis is brought into coincidence with the sixth indexing axis, is calculated, and at least one of a disc-shaped workpiece and a working tool is moved on the basis of the calculated relative movement trajectory.

5 Claims, 20 Drawing Sheets

(56) References Cited

U.S. PATENT DOCUMENTS

| | | | | |
|---|---|---|---|---|
| 2,463,725 | A | * | 3/1949 | Stonebraker ............... 409/26 |
| 2,683,399 | A | * | 7/1954 | Dodge ............... 409/8 |
| 2,953,944 | A | * | 9/1960 | Sundt ............... 475/163 |
| 4,041,808 | A | * | 8/1977 | Fickelscher ............... 475/164 |
| 4,702,126 | A | | 10/1987 | Nakamura |
| 4,966,573 | A | | 10/1990 | Yokoi |
| 5,000,632 | A | * | 3/1991 | Stadtfeld ............... 409/26 |
| 5,022,802 | A | * | 6/1991 | Yokoi ............... 409/52 |
| 5,954,610 | A | * | 9/1999 | Kamimura ............... 475/180 |
| 5,967,883 | A | | 10/1999 | Kamimura |
| 6,205,879 | B1 | * | 3/2001 | Litvin et al. ............... 74/457 |
| 6,632,052 | B2 | * | 10/2003 | Moeri et al. ............... 409/26 |
| 6,964,210 | B2 | * | 11/2005 | Colbourne ............... 74/462 |
| 8,113,915 | B2 | * | 2/2012 | Jankowski et al. ............... 451/47 |
| 8,216,104 | B2 | * | 7/2012 | Kuroumaru et al. ............... 475/164 |
| 2005/0239385 | A1 | * | 10/2005 | Jankowski et al. ............... 451/540 |
| 2006/0090340 | A1 | * | 5/2006 | Fleytman ............... 29/893.3 |
| 2013/0097865 | A1 | * | 4/2013 | Ando et al. ............... 29/893.3 |

FOREIGN PATENT DOCUMENTS

| | | |
|---|---|---|
| JP | 10 235519 | 9/1998 |
| JP | 2000 205379 | 7/2000 |
| JP | 2006 272497 | 10/2006 |
| JP | 2006 315111 | 11/2006 |

OTHER PUBLICATIONS

U.S. Appl. No. 13/578,094, filed Aug. 9, 2012, Ando et al.

* cited by examiner

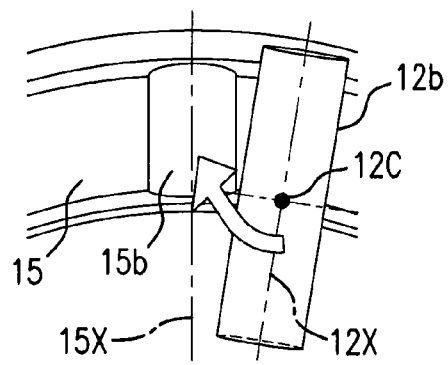
*Fig.6a1*
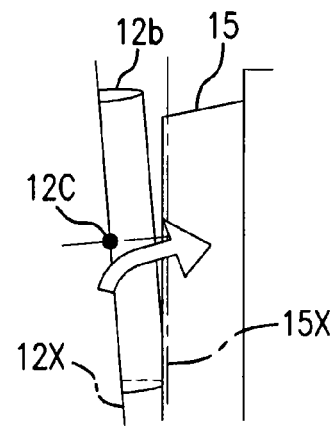
*Fig.6a2*
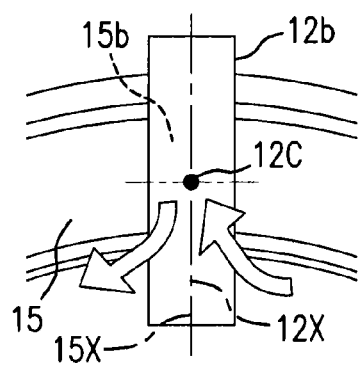
*Fig.6b1*
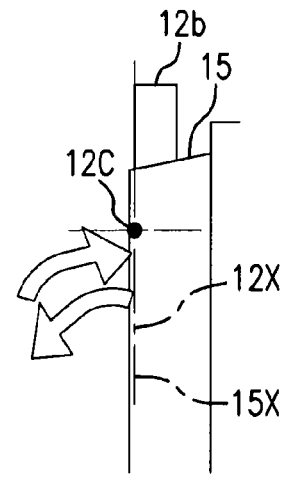
*Fig.6b2*
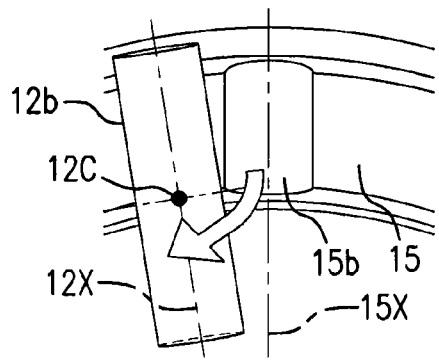
*Fig.6c1*
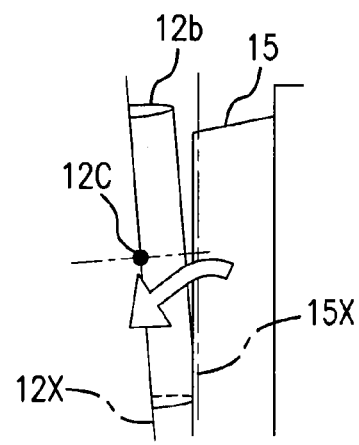
*Fig.6c2*

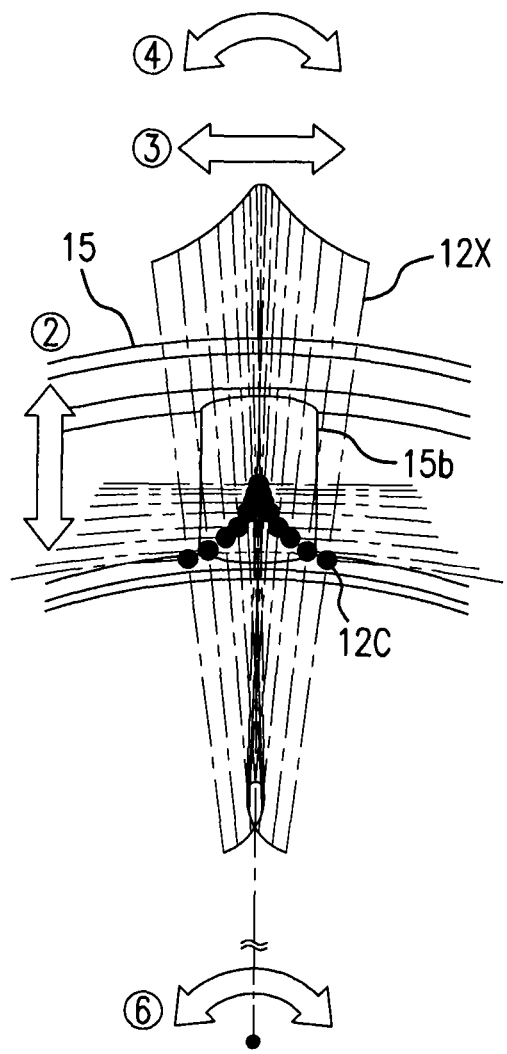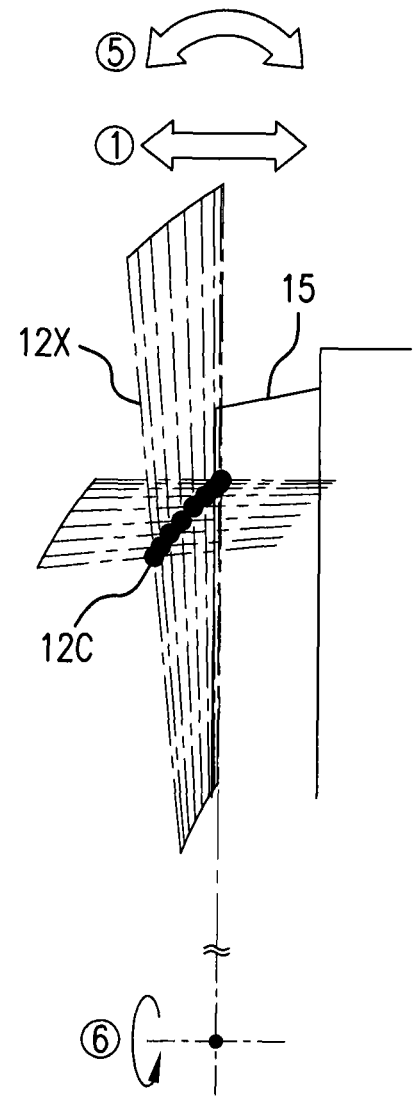
*Fig.7a*        *Fig.7b*

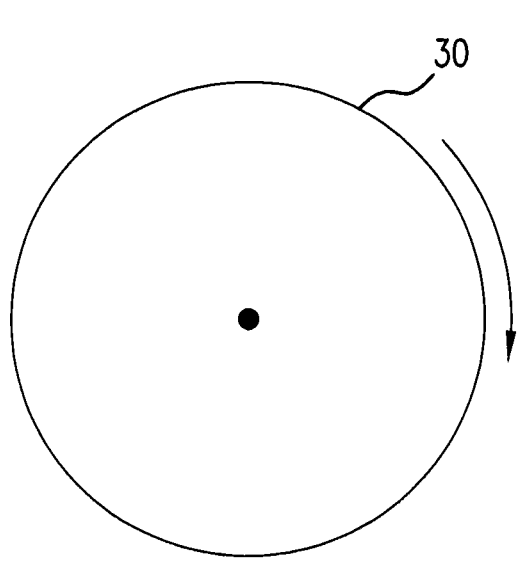 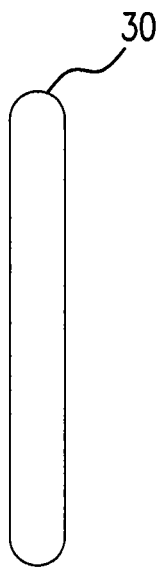
*Fig.9a*      *Fig.9b*
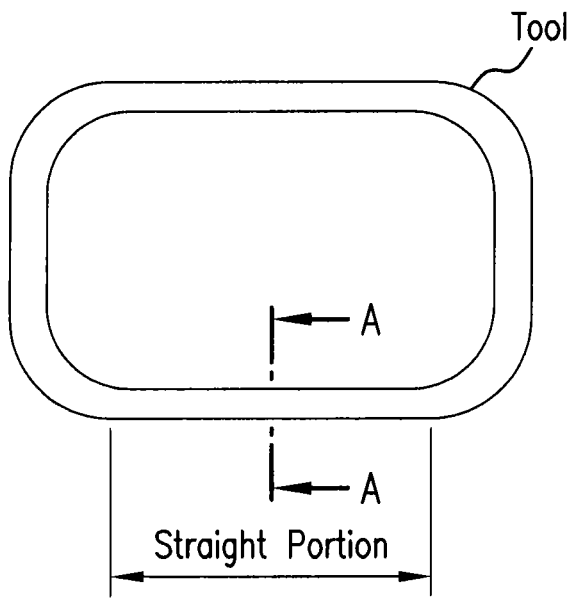 
*Fig.10a*      *Fig.10b*

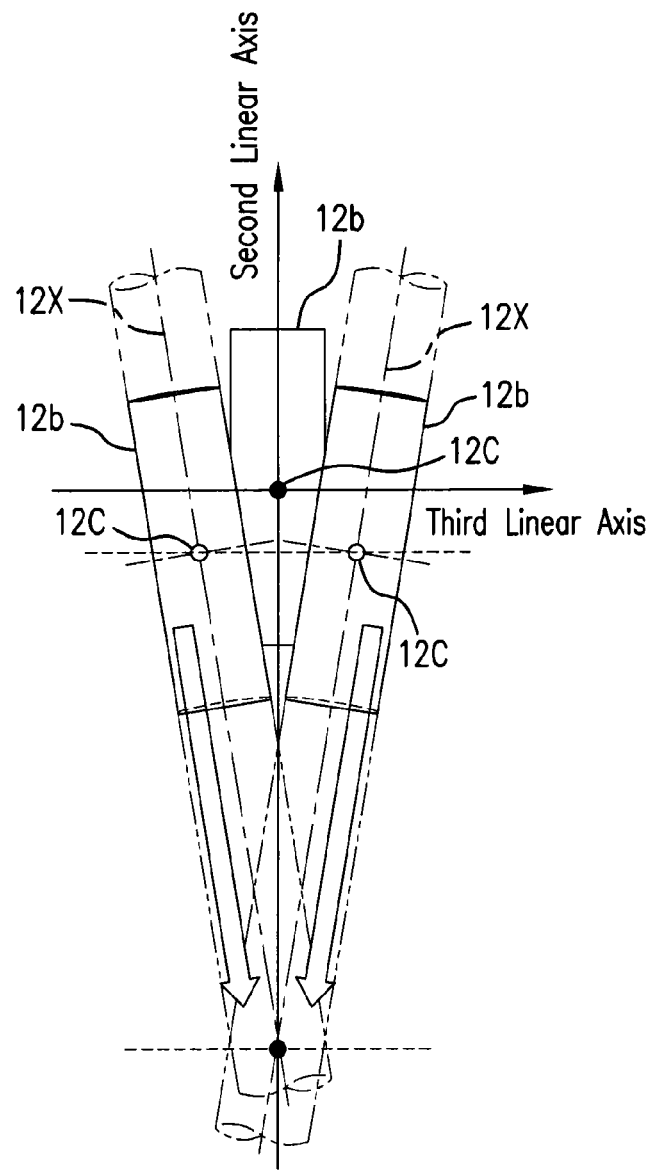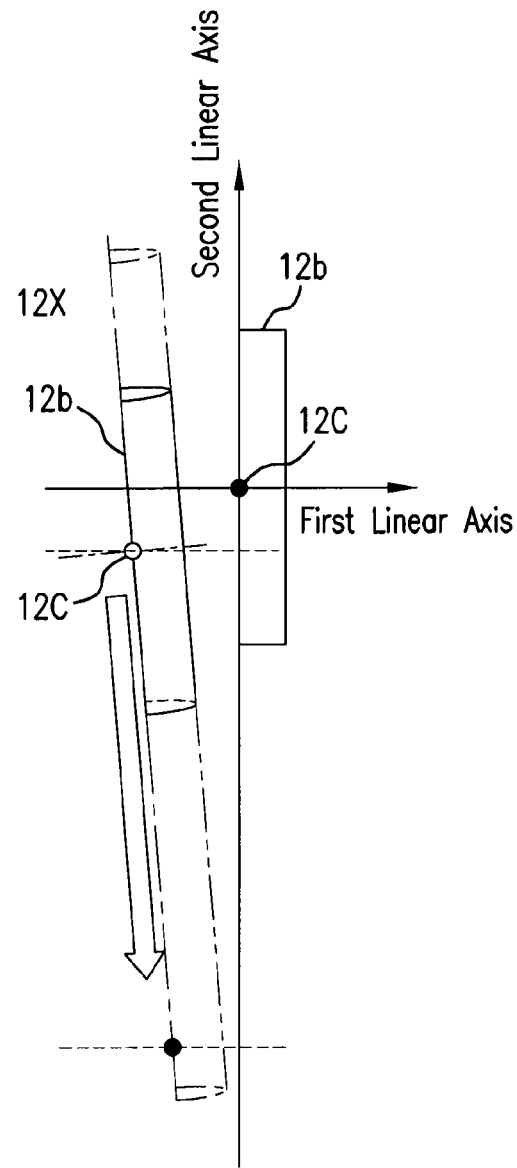
*Fig.16a*  *Fig.16b*

PROCESSING METHOD FOR CONCAVE-CONVEX GEAR

TECHNICAL FIELD

The invention relates to a machining method for a concave-convex gear.

BACKGROUND ART

There is a nutation gear set as one of reduction gears. The nutation gear set is, for example, described in Patent Document 1, or the like. That is, the nutation gear set is formed of a first gear, a second gear and an input shaft that have the same rotation central axis, and a nutation gear that performs differential rotation with respect to the first gear and the second gear while wobbling therebetween. The nutation gear is supported by the input shaft so as to be rotatable about an inclined rotation central axis. Furthermore, the inclined rotation central axis relatively rotates about the rotation central axis of the first gear with the rotation of the input shaft. By so doing, the nutation gear wobbles with respect to the first gear and the second gear. Then, first nutation teeth that mesh with the first gear are formed on a face of the nutation gear, adjacent to the first gear, and second nutation teeth that mesh with the second gear are formed on a face of the nutation gear, adjacent to the second gear. Then, as the nutation gear wobbles, differential rotation occurs between the first gear and the nutation gear or between the second gear and the nutation gear. That is, when the second gear is set as an output shaft with respect to the input shaft, speed may be reduced at a large reduction gear ratio.

The nutation gear has an extremely complex meshing face that meshes with the first gear or the second gear, so machining is not easy. A machining device for the nutation gear is, for example, described in Patent Document 1.

PRIOR ART DOCUMENT

Patent Document

Patent Document 1: Japanese Patent Application Publication No. 2006-272497

SUMMARY OF THE INVENTION

Problem to be Solved by the Invention

Incidentally, various machining methods of machining gears, such as a spur gear and a bevel gear, have been proposed and implemented. Machining of a nutation gear is also implemented using a special purpose machine as described in Patent Document 1; however, a special machining device is used or a special technique is required, so it is not considered to be easy.

The invention is contemplated in view of such a situation, and it is an object of the invention to provide a new machining method as a machining method for a concave-convex gear.

Means for Solving the Problem

In order to solve the above problem, the invention commonalizes two parallel rotation axes to omit one rotation axis in a relative movement trajectory between each convex tooth of a mating gear and a corresponding one of concave teeth of a concave-convex gear at the time of torque transmission.

A feature of the invention according to claim 1 provides a machining method for a concave-convex gear, concave teeth of the concave-convex gear and convex teeth of a mating gear being continuously formed in a circumferential direction, and the concave teeth meshing with convex teeth of the mating gear to allow torque transmission to or from the mating gear, wherein the concave-convex gear is machined from a disc-shaped workpiece, the concave-convex gear is a gear that rotates about an intersecting axis that intersects with a rotation central axis of the mating gear, a sectional shape of an outer peripheral surface of each convex tooth of the mating gear in a direction orthogonal to a reference axis of the convex tooth is formed in a circular arc shape, a relative movement trajectory of each convex tooth of the mating gear with respect to the concave-convex gear at the time when torque is transmitted between the mating gear and the concave-convex gear is expressed by:

a first linear axis along which a reference position of the convex tooth of the mating gear is moved in a direction orthogonal to a plane that is tangent to a concave tooth forming face of the disc-shaped workpiece;

a second linear axis along which the reference position of the convex tooth of the mating gear is moved in a tooth groove direction of a corresponding one of the concave teeth of the concave-convex gear in the plane that is tangent to the concave tooth forming face of the disc-shaped workpiece;

a third linear axis along which the reference position of the convex tooth of the mating gear is moved in a direction orthogonal to the second linear axis in the plane that is tangent to the concave tooth forming face of the disc-shaped workpiece;

a fourth rotation axis along which the reference position of the convex tooth of the mating gear is rotated about the first linear axis;

a fifth rotation axis along which the reference position of the convex tooth of the mating gear is rotated about the third linear axis; and a sixth indexing axis that coincides with a rotation central axis of the concave-convex gear and that indexes a rotation phase of the concave-convex gear, the machining method includes:

calculating the relative movement trajectory of each convex tooth of the mating gear, expressed by the first linear axis, the second linear axis, the third linear axis, the fifth rotation axis and the sixth indexing axis when the fourth rotation axis is brought into coincidence with the sixth indexing axis; and moving at least one of the disc-shaped workpiece and a working tool on the basis of the calculated relative movement trajectory.

A feature of the invention according to claim 2 is such that, in claim 1, the number of the convex teeth of the mating gear is different from the number of the concave teeth of the concave-convex gear. A feature of the invention according to claim 3 is such that claim 1 or 2 further includes: calculating the relative movement trajectory of each convex tooth of the mating gear, expressed by the first linear axis, the third linear axis, the fifth rotation axis and the sixth indexing axis when movement of the reference position of the convex tooth of the mating gear along the second linear axis is assumed to be performed along the third linear axis in the case where it is presumed that a tooth length of the convex tooth is infinite; and moving at least one of the disc-shaped workpiece and the working tool on the basis of the calculated relative movement trajectory.

A feature of the invention according to claim 4 is such that claim 1 or 2 further includes: calculating the relative movement trajectory of each convex tooth of the mating gear, expressed by the first linear axis, the second linear axis, the fifth rotation axis and the sixth indexing axis when movement of the reference position of the convex tooth of the mating gear along the third linear axis is assumed to be performed along the second linear axis in the case where it is presumed that a tooth length of the convex tooth of the mating gear is infinite; and moving at least one of the disc-shaped workpiece and the working tool on the basis of the calculated relative movement trajectory.

A feature of the invention according to claim 5 is such that claim 1 or 2 further includes: calculating the relative movement trajectory of each convex tooth of the mating gear, expressed by the first linear axis, the second linear axis, the third linear axis and the sixth indexing axis, by decomposing movement of the reference position of the convex tooth of the mating gear around the fifth rotation axis into movement of the first linear axis and movement of the second linear axis; and moving at least one of the disc-shaped workpiece and the working tool on the basis of the calculated relative movement trajectory.

Advantageous Effects of the Invention

With the invention according to claim 1 configured as described above, an NC machine tool is used to make it possible to machine the concave teeth of the concave-convex gear. That is, the same NC machine tool may be used to machine concave-convex gears having various shapes. Furthermore, movement along the fourth rotation axis is omitted to make it possible to allow machining with five axes. That is, it is possible to apply a machining device having an axis configuration up to five axes. Specifically, a machining device having three linear axes and two rotation axes may be used to machine the concave teeth of the concave-convex gear.

Here, in a concave-convex gear that rotates about an intersecting axis with respect to a mating gear (hereinafter, also referred to as "concave-convex gear with an intersecting axis"), the meshing rate of the mating gear and the concave-convex gear increases. Therefore, it is possible to reduce size, increase strength and achieve quietness. On the other hand, in order to achieve desirable tooth contact, it is required to form a tooth flank shape having an extremely high accuracy, so there is a problem that machining of a tooth flank shape is not easy. In contrast to this, according to the invention, the concave teeth of the concave-convex gear with an intersecting axis may be easily and highly accurately formed. As a result, according to the invention, it is possible to reduce machining cost in the case of accuracy equivalent to the existing art.

With the invention according to claim 2, because the number of teeth of the mating gear is different from the number of teeth of the concave-convex gear, so it is configured such that torque is transmittable while the mating gear and the concave-convex gear perform differential rotation. Then, because the number of teeth is different therebetween, the shape of each concave tooth of the concave-convex gear is an extremely complex shape. In such a case as well, by applying the invention, it is possible to reliably machine the concave teeth of the concave-convex gear. Note that, when the number of teeth of the mating gear is equal to the number of teeth of the concave-convex gear, that is, when torque is transmitted while rotating at the same number of revolutions as well, the machining method according to the invention is, of course, applicable.

With the invention according to claim 3, movement along the second linear axis is omitted in addition to movement along the fourth rotation axis to make it possible to allow machining with four axes. That is, it is possible to apply a machining device having an axis configuration up to four axes. Specifically, a machining device having two linear axes and two rotation axes may be used to machine the concave teeth of the concave-convex gear.

With the invention according to claim 4, movement along the third linear axis is omitted in addition to movement along the fourth rotation axis to make it possible to allow machining with four axes. That is, it is possible to apply a machining device having an axis configuration up to four axes. Specifically, a machining device having two linear axes and two rotation axes may be used to machine the concave teeth of the concave-convex gear.

With the invention according to claim 5, movement along the fifth rotation axis is omitted in addition to the fourth rotation axis to make it possible to allow machining with four axes. That is, it is possible to apply a machining device having an axis configuration up to four axes. Specifically, a machining device having three linear axes and one rotation axis may be used to machine the concave teeth of the concave-convex gear.

BRIEF DESCRIPTION OF THE DRAWINGS

FIG. 1(a) shows a case where convex tooth pins are respectively separately formed from a fixed shaft body and an output shaft body, and FIG. 1(b) shows a case where convex tooth pins are respectively integrally formed with the fixed shaft body and the output shaft body.

FIG. 2(a) shows a case where the convex tooth pin is separately formed from a fixed shaft, and FIG. 2(b) shows a case where the convex tooth pin is integrally formed with the fixed shaft.

FIG. 6(a1) to FIG. 6(c2) are views that show relative movements between each nutation concave tooth of the nutation gear and a corresponding one of the convex tooth pins (convex teeth). FIG. 6(a1) is a view in the direction along the rotation central axis of the nutation gear in relative position between the convex tooth pin and the nutation concave tooth in a state before the convex tooth pin meshes with the nutation concave tooth. FIG. 6(a2) is a view from the right side of FIG. 6(a1). FIG. 6(b1) is a view in the direction along the rotation central axis of the nutation gear in relative position between the convex tooth pin and the nutation concave tooth in a state where the convex tooth pin is in mesh with the nutation concave tooth. FIG. 6(b2) is a view from the right side of FIG. 6(b1). FIG. 6(c1) is a view in the direction along the rotation central axis of the nutation gear in relative position between the convex tooth pin and the nutation concave tooth in a state where the convex tooth pin is separated from the meshed state with the nutation concave tooth. FIG. 6(c2) is a view from the right side of FIG. 6(c1). In FIG. 6(a1) to FIG. 6(c2), the alternate long and short dash line in the longitudinal direction of the convex tooth pin indicates the reference axis of the convex tooth pin, and the filled circle indicates the central position of the convex tooth pin.

FIG. 7(a) is a view that shows the movement trajectory of the reference axis of the convex tooth pin and the movement trajectory of the central position of the convex tooth pin with respect to the nutation gear when viewed in the direction along the rotation central axis of the nutation gear. FIG. 7(b) is a view that shows the movement trajectory of the reference axis of the convex tooth pin and the movement trajectory of the central position of the convex tooth pin with respect to the nutation gear when viewed in the radial direction of the nutation gear. Numeric characters in circles coincide with axis numbers.

FIG. 8 is a view in the case where the central position of the convex tooth pin is shifted onto the third linear axis.

FIG. 9(a) and FIG. 9(b) are views that show a toroidal grinding wheel (disc-shaped tool). FIG. 9(a) is a view of the toroidal grinding wheel when viewed in the direction along the rotation axis, and FIG. 9(b) is a view in the radial direction.

FIG. 10(a) and FIG. 10(b) show a circulating belt grinding wheel that serves as a working tool, FIG. 10(a) is a view in the direction along the rotation axis of the circulating belt grinding wheel, and FIG. 10(b) is an A-A sectional view of FIG. 10(a).

FIG. 11(a) shows the axis configuration of the machine tool in a plane parallel to a second linear axis and the third linear axis, and FIG. 11(b) shows the axis configuration of the machine tool in a plane parallel to a first linear axis and the second linear axis. Numeric characters in circles coincide with axis numbers.

FIG. 12 is a view in the case where the central position of the convex tooth pin is shifted onto the second linear axis.

FIG. 13(a) is a view in the plane that passes through the second linear axis and the third linear axis. FIG. 13(b) is a view in the plane that passes through the first linear axis and the second linear axis.

FIG. 14(a) is a view in the case where the central position of the convex tooth pin is decomposed into a component in the plane that passes through the second linear axis and the third linear axis, and FIG. 14(b) is a view in the case where the central position of the convex tooth pin is decomposed into a component in the plane that passes through the first linear axis and the second linear axis.

FIG. 15(a) shows the axis configuration of the machine tool in the plane parallel to the second linear axis and the third linear axis, and FIG. 15(b) shows the axis configuration of the machine tool in the plane parallel to the first linear axis and the second linear axis. Numeric characters in circles coincide with axis numbers.

FIG. 16(a) and FIG. 16(b) are conceptual explanatory views in the case where movement along the third linear axis is decomposed into movement along the first linear axis and movement along the second linear axis in a fourth embodiment. FIG. 16(a) is a view in the plane that passes through the second linear axis and the third linear axis. FIG. 16(b) is a view in the plane that passes through the first linear axis and the second linear axis.

FIG. 17(a) is a view in the case where the central position of the convex tooth pin is decomposed into a component in the plane that passes through the second linear axis and the third linear axis, and FIG. 17(b) is a view in the case where the central position of the convex tooth pin is decomposed into a component in the plane that passes through the first linear axis and the second linear axis.

FIG. 18(a) shows the axis configuration of the machine tool in the plane parallel to the second linear axis and the third linear axis, and FIG. 18(b) shows the axis configuration of the machine tool in the plane parallel to the first linear axis and the second linear axis. Numeric characters in circles coincide with axis numbers.

FIG. 20(a) is a view in the direction along the rotation central axis of the nutation gear, FIG. 20(b) is a view from the right side of FIG. 20(a).

FIG. 23(a) shows a case where convex tooth pins are separately formed from an input shaft body, and FIG. 23(b) shows a case where the convex tooth pins are integrally formed with the input shaft body.

MODES FOR CARRYING OUT THE INVENTION

Hereinafter, specific embodiments of a machining method for a concave-convex gear according to the invention will be described with reference to the drawings. Here, a nutation gear set is formed of two pairs of the relationship between a concave-convex gear and a mating gear in the case where a rotation central axis of the concave-convex gear intersects with a rotation central axis of the mating gear. In the present embodiments, a machining method and machining device for a nutation gear of a nutation gear set will be described by way of example. Note that, in the following description, a nutation gear corresponds to a "concave-convex gear" according to the invention, and a fixed shaft 12 and an output shaft 13 each correspond to a "mating gear" according to the invention.

First Embodiment

Five-Axis Configuration (Three Linear Axes and Two Rotation Axes) (First Example of Omission of Fourth Rotation Axis)

A machining method and machining device for a nutation gear of a nutation gear set according to a first embodiment will be described with reference to FIG. 1 to FIG. 9. The machining device in the present embodiment shows the case of a five-axis configuration having three orthogonal linear axes and two rotation axes. In the first embodiment, movement along a fourth rotation axis is decomposed into movement along a sixth indexing axis and movement along a third linear axis.

(1) Configuration of Nutation Gear Set

Figure 1A:
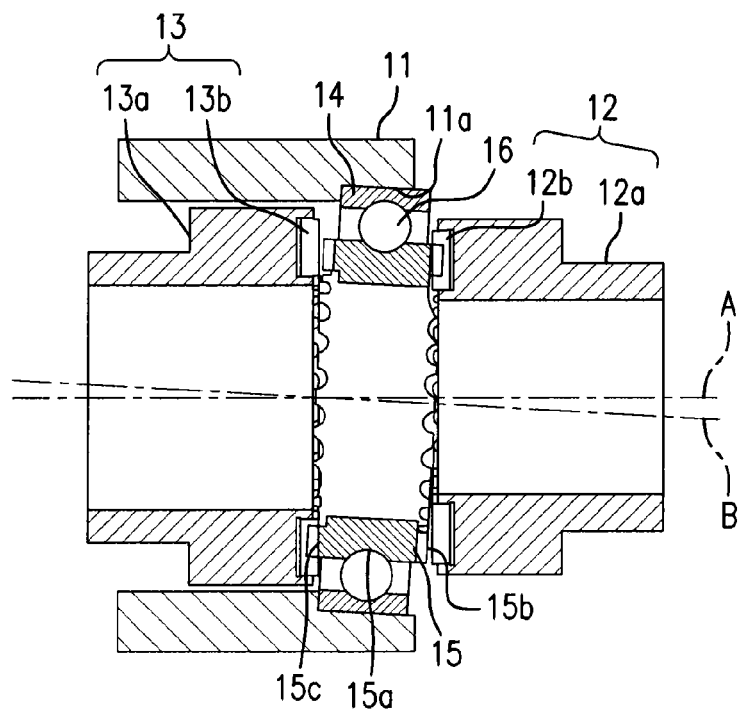
FIG. 1(a) and FIG. 1(b) are axially sectional views of a nutation gear set.
Figure 1B:
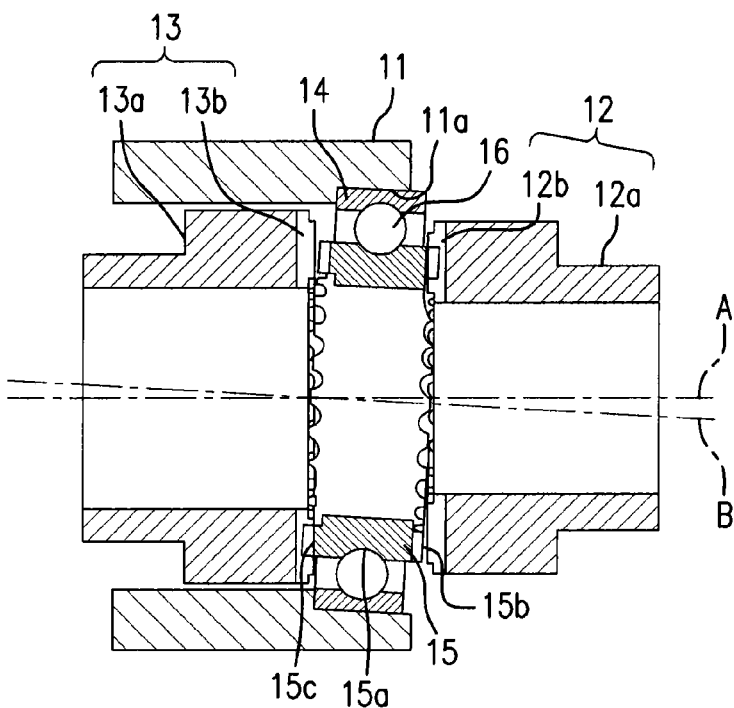

The configuration of the nutation gear set that uses the nutation gear that is a machining object of the invention will be described with reference to FIG. 1 to FIG. 4. Here, FIG. 1(a) shows a case where convex tooth pins 12b and 13b are respectively separately formed from a fixed shaft body 12a and an output shaft body 13a, and FIG. 1(b) shows a case where the convex tooth pins 12b and 13b are respectively integrally formed with the fixed shaft body 12a and the output shaft body 13a. Note that, hereinafter, description will be made mainly with reference to FIG. 1(a), and FIG. 1(b) will be described in terms of only the difference from FIG. 1(a).

The nutation gear set is used as a reduction gear, and is able to obtain an extremely large reduction gear ratio. As shown in FIG. 1(a), the nutation gear set mainly includes an input shaft 11, a fixed shaft 12 (that corresponds to a "mating gear" of the invention), an output shaft 13 (that corresponds to a "mating gear" of the invention), an outer ring 14, an inner ring 15 (that corresponds to a "concave-convex gear" of the invention) and rolling elements 16.

The input shaft 11 constitutes a rotor of a motor (not shown), and is a shaft that rotates as the motor is driven. The input shaft has a cylindrical shape, and rotates about a rotation central axis A (shown in FIG. 1(a)). An inclined surface 11a is formed on the inner peripheral surface of the input shaft 11. The inclined surface 11a is a cylindrical inner peripheral surface that has an axis B, inclined at a slight angle with respect to the rotation central axis A, as a central axis.

The fixed shaft 12 (that corresponds to the "mating gear" of the invention) is fixed to a housing (not shown). The fixed shaft 12 is formed of the fixed shaft body 12a and the plurality of convex tooth pins 12b. The fixed shaft body 12a (that corresponds to a "mating gear body" of the invention) is a cylindrical member having the axis A as a rotation central axis. A plurality (G1) of the convex tooth pins 12b (that correspond to "convex teeth of the mating gear" of the invention) are supported on an axial end face of the fixed shaft body 12a at equal intervals in a circumferential direction of the rotation central axis A. Then, each of the convex tooth pins 12b is formed in a circular columnar shape or a cylindrical shape, and both ends thereof are supported by the fixed shaft body 12a such that the convex tooth pins 12b are arranged radially. Furthermore, each of the convex tooth pins 12b is supported by the fixed shaft body 12a so as to be rotatable about an axis in an axial direction (reference axis direction) of the convex tooth pin 12b and in a radial direction of the fixed shaft body 12a. Furthermore, part of each convex tooth pin 12b protrudes from the axial end face of the fixed shaft body 12a. That is, the fixed shaft 12 functions as a gear having convex teeth of which the number of teeth is Z1.

Figure 2A:
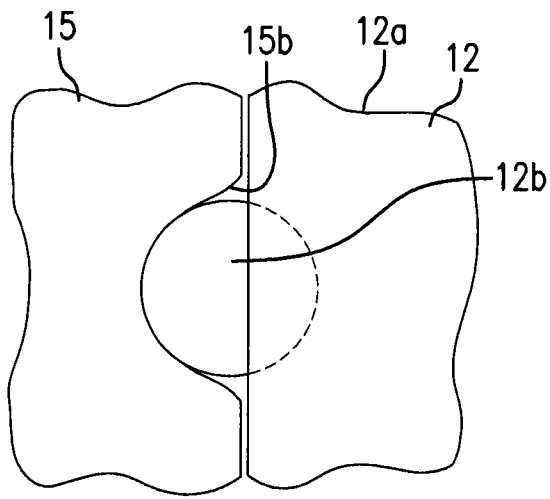
FIG. 2(a) and FIG. 2(b) are enlarged views of a meshing portion between each convex tooth pin (convex tooth) and a nutation gear, and are views in an axial direction of the convex tooth pin.
Figure 2B:
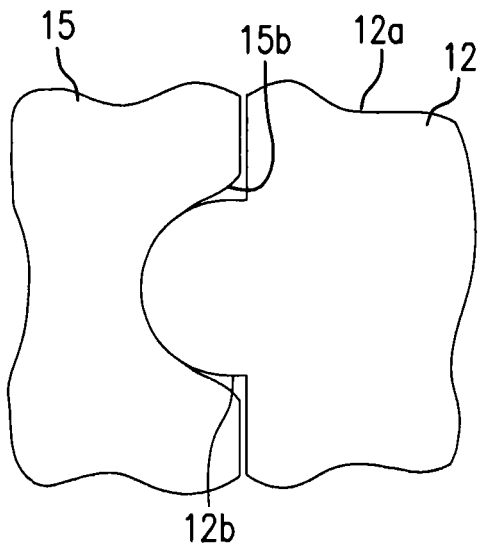

In addition, in the above description, as shown in FIG. 1(a) and FIG. 2(a), the convex tooth pins 12b of the fixed shaft 12 are separately formed from the fixed shaft body 12a, and are supported by the fixed shaft body 12a. Other than this, as shown in FIG. 1(b) and FIG. 2(b), the convex tooth pins 12b may be integrally formed with the fixed shaft body 12a. In this case, the integrally formed convex tooth pins 12b, as well as the portions of the convex tooth pins 12b protruding from the axial end face of the fixed shaft body 12a in the separately formed case, protrude from the axial end face of a portion corresponding to the fixed shaft body 12a.

The output shaft 13 (that corresponds to the "mating gear" of the invention) is supported by the housing (not shown) so as to be rotatable about the rotation central axis A, and is coupled to an output member (not shown). The output shaft 13 is formed of the output shaft body 13a and the plurality of convex tooth pins 13b. The output shaft body 13a (that corresponds to a "mating gear body" of the invention) is a cylindrical member having the axis A as a rotation central axis. That is, the output shaft body 13a is provided coaxially with the input shaft 11 and the fixed shaft body 12a.

A plurality (G4) of the convex tooth pins 13b (that correspond to "convex teeth of the mating gear" of the invention) are supported on an axial end face of the output shaft body 13a at equal intervals in the circumferential direction of the rotation central axis A. Then, each of the convex tooth pins 13b is formed in a circular columnar shape or a cylindrical shape, and both ends thereof are supported by the output shaft body 13a such that convex tooth pins 13b are arranged radially. Furthermore, each of the convex tooth pins 13b is supported by the output shaft body 13a so as to be rotatable about an axis in an axial direction (reference axis direction) of the convex tooth pin 13b and in a radial direction of the output shaft body 13a. Furthermore, the axial end face of the output shaft body 13a, supporting the convex tooth pins 13b, is provided so as to face and is spaced apart at a predetermined distance in the axial direction from the axial end face of the fixed shaft body 12a, supporting the convex tooth pins 12b. Furthermore, part of each convex tooth pin 13b protrudes from the axial end face of the output shaft body 13a. That is, the output shaft 13 functions as a gear having convex teeth of which the number of teeth is Z4.

In addition, in the above description, the convex tooth pins 13b of the output shaft 13 are separately formed from the output shaft body 13a, and are supported by the output shaft body 13a. Other than this, as corresponding to FIG. 1(b) and FIG. 2(b), the convex tooth pins 13b may be integrally formed with the output shaft body 13a. In this case, the integrally formed convex tooth pins 13b, as well as the portions of the convex tooth pins 13b protruding from the axial end face of the output shaft body 13a in the separately formed case, protrude from the axially end face of a portion corresponding to the output shaft body 13a.

The outer ring 14 is formed in a cylindrical shape, and has a raceway surface on its inner peripheral surface. The outer ring 14 is press-fitted to the inclined surface 11a of the input shaft 11. That is, the outer ring 14 is integrated with the input shaft 11, and is rotatable about the rotation central axis B.

The inner ring 15 (that corresponds to the "concave-convex gear" of the invention) is formed in a substantially cylindrical shape. A rolling surface 15a is formed on the outer peripheral surface of the inner ring 15. Furthermore, a plurality (G2) of nutation concave teeth 15b are formed on one axial (right side in FIG. 1(a)) end face of the inner ring 15 at equal intervals in the circumferential direction. In addition, a plurality (G3) of nutation concave teeth 15c are formed on the other axial (left side in FIG. 1(a)) end face of the inner ring 15 at equal intervals in the circumferential direction.

The inner ring 15 is arranged so as to be spaced apart on a radially inner side of the outer ring 14, and holds the plurality of rolling elements (balls) 16. That is, the inner ring 15 has the rotation central axis B that is inclined with respect to the rotation central axis A. Thus, the inner ring 15 is rotatable about the rotation central axis B with respect to the input shaft 11. Furthermore, the inner ring 15 is rotatable about the rotation central axis A as the input shaft 11 rotates about the rotation central axis A through driving of the motor.

Furthermore, the inner ring 15 is arranged between the fixed shaft 12 and the output shaft 13 in the axial direction. Specifically, the inner ring 15 is arranged between the axial end face of the fixed shaft body 12a, supporting the convex tooth pins 12b, and the axial end face of the output shaft body 13a, supporting the convex tooth pins 13b. Then, the one-side nutation concave teeth 15b of the inner ring 15 mesh with the convex tooth pins 12b of the fixed shaft 12. In addition, the other-side nutation concave teeth 15c of the inner ring 15 mesh with the convex tooth pins 13b of the output shaft 13.

Then, because the inner ring 15 wobbles about the rotation central axis A with respect to the fixed shaft 12, part (upper part in FIG. 1(a)) of the one-side nutation concave teeth 15b of the inner ring 15 are in mesh with the convex tooth pins 12b of the fixed shaft 12; however, the other part (lower part in FIG. 1(a)) of the one-side nutation concave teeth 15b are spaced apart from the convex tooth pins 12b of the fixed shaft 12. In addition, because the inner ring 15 wobbles about the rotation central axis A with respect to the output shaft 13, part (lower part in FIG. 1(a)) of the other-side nutation concave teeth 15c of the inner ring 15 are in mesh with the convex tooth pins 13b of the output shaft 13; however, the other part (upper part in FIG. 1(a)) of the other-side nutation concave teeth 15c are spaced apart from the convex tooth pins 13b of the output shaft 13.

Then, for example, the number of teeth Z1 of the convex tooth pins 12b of the fixed shaft 12 is set so as to be smaller than the number of teeth Z2 of the one-side nutation concave teeth 15b of the inner ring 15, and the number of teeth Z4 of the convex tooth pins 13b of the output shaft 13 is set so as to be equal to the number of teeth Z3 of the other-side nutation concave teeth 15c of the inner ring 15. By so doing, the output shaft 13 reduces speed (performs differential rotation) with respect to the rotation of the input shaft 11. That is, in this example, differential rotation is performed between the inner ring 15 and the fixed shaft 12; whereas differential rotation is not performed between the inner ring 15 and the output shaft 13. However, differential rotation may be caused to occur between the output shaft 13 and the inner ring 15 such that the number of teeth Z4 of the convex tooth pins 13b of the output shaft 13 is set so as to be different from the number of teeth Z3 of the other-side nutation concave teeth 15c of the inner ring 15. These may be set on the basis of a reduction gear ratio where appropriate.

In the nutation gear set shown in FIG. 1(a), the meshing portion between the convex tooth pins 12b of the fixed shaft 12 and the one-side nutation concave teeth 15b of the inner ring 15, between which differential rotation occurs, is as shown in FIG. 2(a). In addition, in the nutation gear set shown in FIG. 1(b), the meshing portion between the convex tooth pins 12b of the fixed shaft 12 and the one-side nutation concave teeth 15b of the inner ring 15, between which differential rotation occurs, is as shown in FIG. 2(b). Here, FIG. 2(a) shows a case where the convex tooth pins 12b in the fixed shaft 12 are separately formed from the fixed shaft body 12a. FIG. 2(b) shows a case where the convex tooth pins 12b in the fixed shaft 12 are integrally formed with the fixed shaft body 12a. The present embodiment may be applied to any cases of FIG. 2(a) and FIG. 2(b). Note that, when differential rotation occurs between the output shaft 13 and the inner ring 15, the meshing portion between the convex tooth pins 13b of the output shaft 13 and the other-side nutation concave teeth 15c of the inner ring 15 is also similar to that of FIG. 2(a) or FIG. 2(b). Then, in the following description, only the meshing portion between the fixed shaft 12 and the nutation gear 15 will be described.

Figure 3:
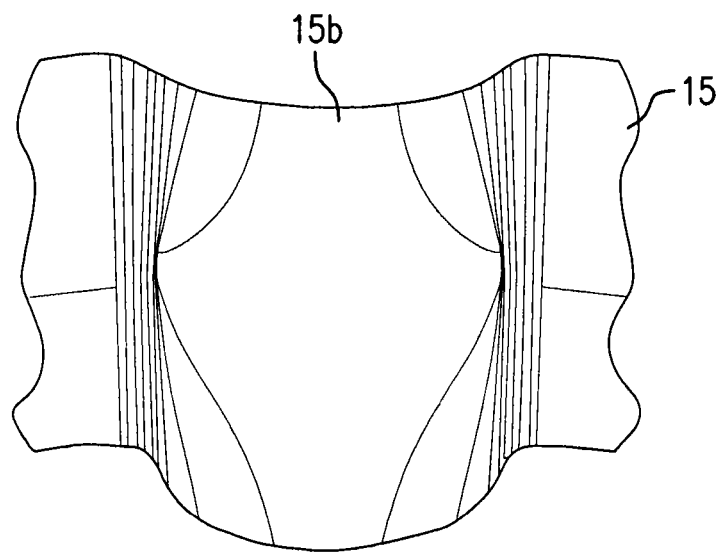
FIG. 3 is a perspective view of each nutation concave tooth.
Figure 4A:
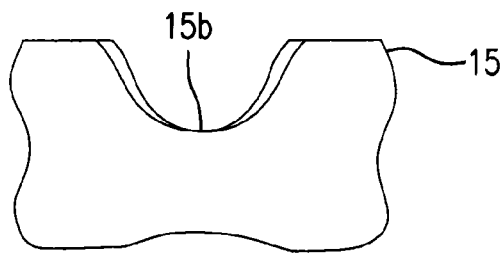
FIG. 4(a) is a view of each nutation concave tooth when viewed from a radially outer side of the nutation gear.
Figure 4B:
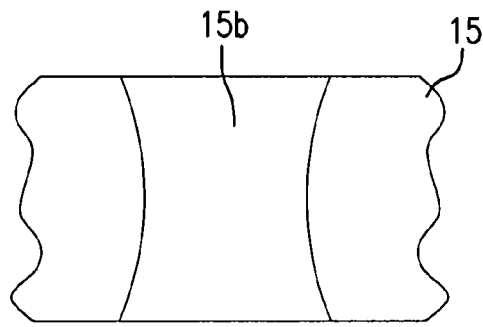
FIG. 4(b) is a view of each nutation concave tooth when viewed in a direction along a rotation central axis of the nutation gear.

Here, each of the nutation concave teeth 15b has a shape shown in FIG. 3 and FIG. 4. That is, the sectional shape in the direction orthogonal to the tooth groove direction of each of the nutation concave teeth 15b has substantially a semicircular arc concave shape as a whole as shown in FIG. 2 and FIG. 4(a). More specifically, the sectional shape has a shape such that circular arc concave-shaped opening edge portions are sagged. Furthermore, as shown in FIG. 3 and FIG. 4(b), each of the nutation concave teeth 15b has a shape such that the groove width widens toward both ends in the tooth groove direction. This is because the number of teeth Z1 of the convex tooth pins 12b is different from the number of teeth Z2 of the nutation concave teeth 15b.

Figure 5:
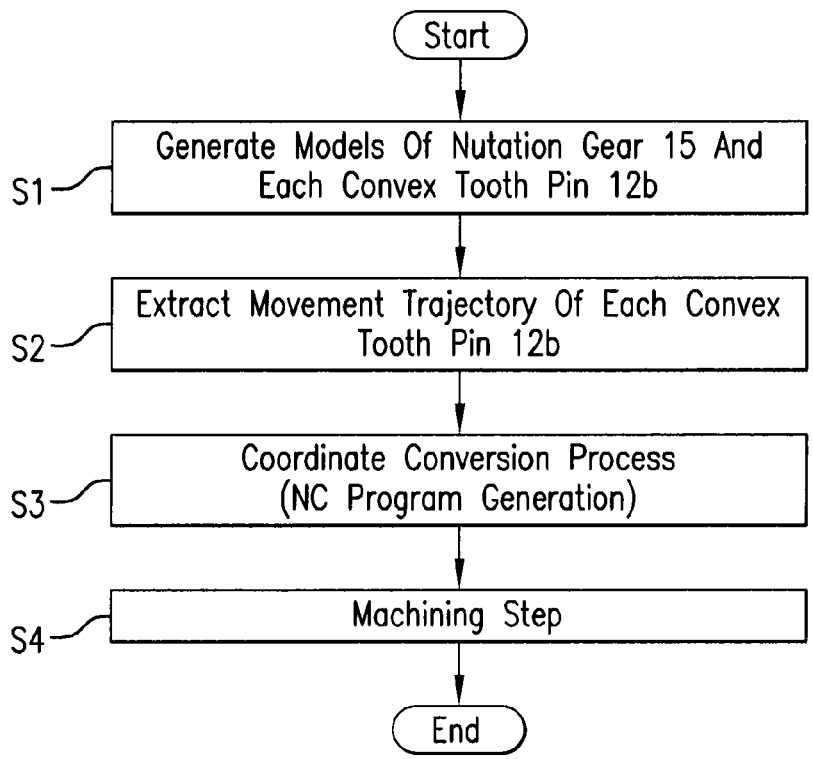
FIG. 5 is a flow chart that shows processes in a first embodiment.

(2) Machining Method and Machining Device for Nutation Gear (2.1) Basic Concept of Machining Method for Nutation Gear Next, a machining method for the nutation concave teeth 15b of the inner ring 15 (hereinafter, referred to as "nutation gear") in the above described nutation gear set will be described. Note that a similar machining method is employed for the nutation concave teeth 15c of the nutation gear 15. First, the procedure of the machining method will be described with reference to FIG. 5. As shown in FIG. 5, three-dimensional CAD models or mathematical models of the nutation gear 15 and each convex tooth pin 12b are generated (S1). This model is a movement model in which the nutation gear 15 and the fixed shaft 12 perform differential rotation.

Subsequently, the relative movement trajectory of each convex tooth pin 12b with respect to a corresponding one of the nutation concave teeth 15b at the time when both perform differential rotation is extracted (S2) ("trajectory extracting step", "trajectory extracting means"). At the time of extracting the relative movement trajectory, it is presumed that the nutation concave teeth 15b are fixed and the convex tooth pins 12b move with respect to the nutation concave teeth 15b, and the movement trajectory of each convex tooth pin 12b is extracted. Then, the movement trajectory of each convex tooth pin 12b includes the movement trajectory of the central axis 12X (hereinafter, referred to as "reference axis") of the convex tooth pin 12b and the movement trajectory of the central point (hereinafter, referred to as "pin central point") of the convex tooth pin 12b in the central axis direction. Note that the reference axis 12X of the convex tooth pin 12b corresponds to an axis parallel to the line of intersection of the tooth thickness central plane and reference conical surface of the convex tooth pin 12b.

Subsequently, the extracted relative movement trajectory of each convex tooth pin 12b with respect to the nutation gear 15 is subjected to coordinate conversion to generate an NC program that is the movement trajectory of a working tool (S3) ("coordinate conversion step", "coordinate conversion means"). The NC program corresponds to the movement trajectory of the working tool for machining the nutation concave teeth 15b in a workpiece coordinate system. In this step, the process of omitting movement along the fourth rotation axis is executed. This will be described in detail later.

Subsequently, at least one of a disc-shaped workpiece and the working tool is moved on the basis of the generated NC program (S4) ("machining step", "machining means"). That is, at least one of the disc-shaped workpiece and the working tool is moved such that the relative movement trajectory of the working tool with respect to the disc-shaped workpiece coincides with the movement trajectory of each convex tooth pin 12b, extracted in step S2. Here, the disc-shaped workpiece is a material that is formed into the shape of the nutation gear 15 and that have not been machined for the nutation concave teeth 15b yet.

Hereinafter, the trajectory extracting step, the coordinate conversion step and the machining step will be described in detail.

(2.2) Trajectory Extracting Step (Trajectory Extracting Means)

The trajectory extracting step will be described with reference to FIG. 6(a1) to FIG. 6(c2). In the drawings of FIG. 6, for the shape of each convex tooth pin 12b, only the portion of each convex tooth pin 12b, protruding from the fixed shaft body 12a of the fixed shaft 12 shown in FIG. 2(a) and FIG. 2(b), is shown. That is, in the drawings of FIG. 6, the convex tooth pin 12b shows the portion common to the convex tooth pins 12b shown in FIG. 2(a) and FIG. 2(b);

In a state before the convex tooth pin 12b meshes with the nutation concave tooth 15b, as shown in FIG. 6(a1), when viewed in the rotation central axis direction ("B" in FIG. 1(a) and FIG. 1(b)) of the nutation gear 15, the reference axis 12X of the convex tooth pin 12b is inclined rightward in FIG. 6(a1) with respect to the tooth groove direction 15X of the nutation concave tooth 15b. Furthermore, as shown in FIG. 6(a2), when viewed in the direction orthogonal to the tooth groove direction 15X along the contact surface of the reference conical surface of the nutation concave tooth 15b, the reference axis 12X of the convex tooth pin 12b is inclined leftward in FIG. 6(a2) with respect to the tooth groove direction 15X of the nutation concave teeth 15b. Then, in both drawings, the pin central point 12C of the convex tooth pin 12b is located at a position that deviates from the tooth groove direction 15X of the nutation concave tooth 15b.

Subsequently, in a state where the convex tooth pin 12b is in mesh with the nutation concave tooth 15b, as shown in FIG. 6(b1) and FIG. 6(b2), the tooth groove direction 15X of the nutation concave tooth 15b coincides with the reference axis 12X of the convex tooth pin 12b. Of course, the pin central point 12C of the convex tooth pin 12b also coincides with the tooth groove direction 15X of the nutation concave tooth 15b.

Subsequently, in a state where the convex tooth pin 12b is separated from a meshed state with the nutation concave tooth 15b, as shown in FIG. 6(c1), when viewed in the rotation central axis direction ("B" in FIG. 1(a) and FIG. 1(b)) of the nutation gear 15, the reference axis 12X of the convex tooth pin 12b is inclined leftward in FIG. 6(c1) with respect to the tooth groove direction 15X of the nutation concave tooth 15b. Furthermore, as shown in FIG. 6(c2), when viewed in the direction orthogonal to the tooth groove direction 15X along the contact surface of the reference conical surface of the nutation concave tooth 15b, the reference axis 12X of the convex tooth pin 12b is inclined leftward in FIG. 6(c2) with respect to the tooth groove direction 15X of the nutation concave tooth 15b. Then, in both drawings, the pin central point 12C of the convex tooth pin 12b is located at a position that deviates from the tooth groove direction 15X of the nutation concave tooth 15b.

That is, the movement trajectory of the reference axis 12X of the convex tooth pin 12b and the movement trajectory of the pin central point 12C are as shown in FIG. 7. The movement trajectory of the reference axis 12X may be decomposed into and expressed by a first linear axis, a second linear axis, the third linear axis, the fourth rotation axis, a fifth rotation axis and the sixth indexing axis. Here, in FIG. 7 and the following drawings, numeric characters in circles coincide with the respective axis numbers. For example, the axis indicated such that the numeric character in circle is "1" is the first linear axis.

That is, the first linear axis is an axis along which the reference position (predetermined position) of the convex tooth pin 12b is moved in the direction orthogonal to a plane that is tangent to a concave tooth forming face ("axial end face" in the present embodiment) of the disc-shaped workpiece (nutation gear 15). The second linear axis is an axis along which the reference position of the convex tooth pin 12b is moved in the tooth groove direction of the nutation concave tooth 15b in the plane that is tangent to the concave tooth forming face of the disc-shaped workpiece (nutation gear 15). The third linear axis is an axis along which the reference position of the convex tooth pin 12b is moved in the direction orthogonal to the second linear axis in the plane that is tangent to the concave tooth forming face of the disc-shaped workpiece (nutation gear 15).

The fourth rotation axis is an axis along which the reference position of the convex tooth pin 12b is rotated about the first linear axis. The fifth rotation axis is an axis along which the reference position of the convex tooth pin 12b is rotated about the third linear axis. The fourth rotation axis and the fifth rotation axis shown here are axes that rotate about the pin central point 12C of the convex tooth pin 12b. The sixth indexing axis is an axis that coincides with the rotation central axis B (shown in FIG. 1(a) and FIG. 1(b)) of the nutation gear 15 and that indexes the rotation phase of the nutation gear 15.

(2.3) Coordinate Conversion Step (Coordinate Conversion Means)

Figure 8:
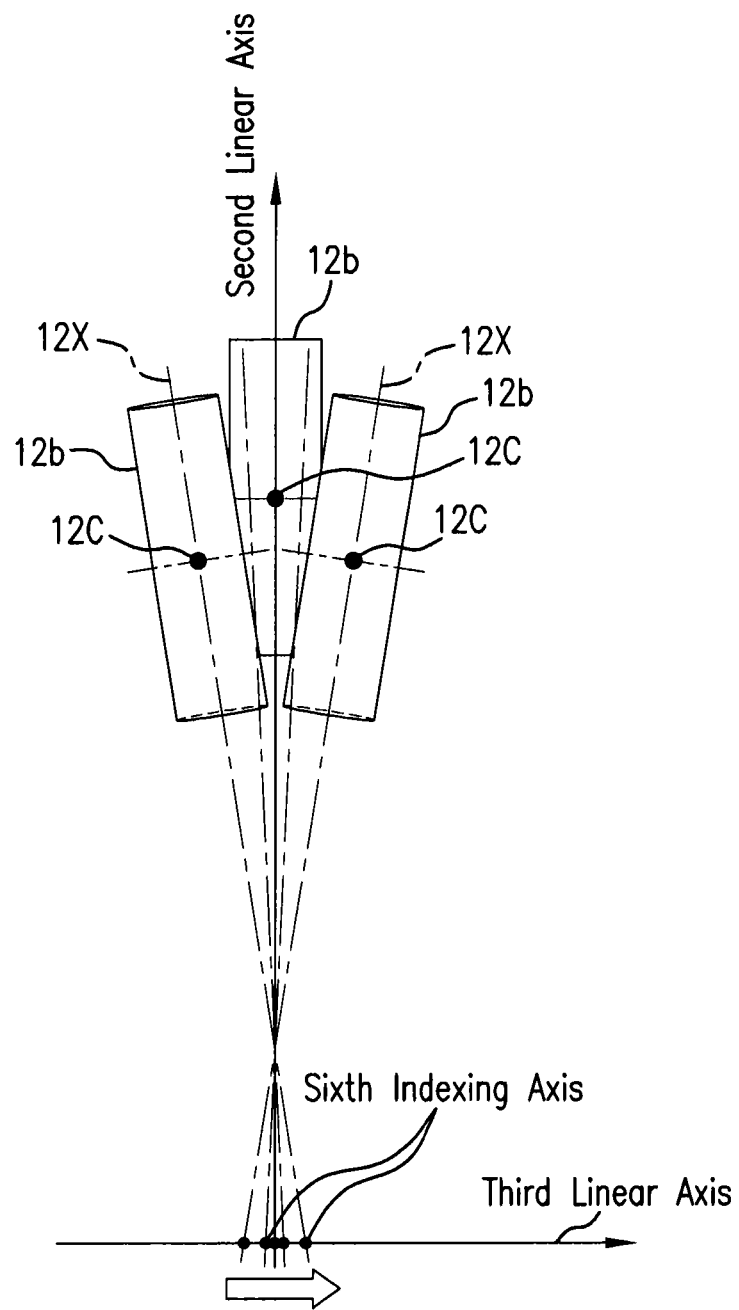
FIG. 8 is an explanatory view in the case where movement along a fourth rotation axis is decomposed into movement along a sixth indexing axis and movement along a third linear axis in the first embodiment. That is.

Here, the subject machine tool in the present embodiment has a machine configuration having first to third, fifth and sixth axes. In the steps, first, the process of decomposing movement along the fourth rotation axis into those of the sixth indexing axis and the third linear axis to omit movement along the fourth rotation axis is executed. Here, the fourth rotation axis is an axis that rotates about an axis parallel to the sixth indexing axis. Then, as shown in FIG. 8, the center of the fourth rotation axis, that is, the pin central point 12C of the convex tooth pin 12b is brought into coincidence with the rotation center of the sixth indexing axis (the rotation central axis B of the nutation gear 15). At this time, at the time of shifting the pin central point 12C of the convex tooth pin 12b, the pin central point 12C is shifted along the reference axis 12X of the convex tooth pin 12b. That is, it is presumed that the tooth length of the convex tooth pin 12b is infinite, and the rotation center of the shifted fourth rotation axis moves along the third linear axis. In this way, when movement along the fourth rotation axis is decomposed into the sixth indexing axis and the third linear axis, movement along the fourth rotation axis may be omitted. As a result, as shown in FIG. 8, the relative movement trajectory of the convex tooth pin 12b is expressed by three linear axes and two rotation axes.

Furthermore, subsequently, in the coordinate conversion step, an NC program expressed by the three linear axes and the two rotation axes is generated on the basis of the calculated movement trajectories of the three linear axes, that is, the first linear axis, the second linear axis and the third linear axis, and the two rotation axes, that is, the fifth rotation axis and the sixth indexing axis.

(2.4) Machining Step (Machining Means)

The working tool in the present embodiment may be any tool as long as it is possible to express the outer peripheral shape of the convex tooth pin 12b. A first working tool is a tool having a circular columnar pin shape that is coincident with or small similar to the outer peripheral shape of the convex tooth pin 12b and that rotates about the pin central axis. In addition, a second working tool is a toroidal grinding wheel 30 as shown in FIG. 9(a) and FIG. 9(b). The toroidal grinding wheel 30 is a disc-shaped tool shown in FIG. 9(a), and its outer peripheral edge shape is, for example, a circular arc convex shape shown in FIG. 9(b). The width of the toroidal grinding wheel 30, shown in FIG. 9(b), is smaller than or equal to the diameter of the convex tooth pin 12b. Through cutting operation at multiple portions at which the central axis of the toroidal grinding wheel 30 is shifted in the tooth groove direction of the concave tooth 15b, the convex tooth pin 12b is spuriously expressed by the toroidal grinding wheel 30. In addition, a circulating belt-shaped tool shown in FIG. 10(a) and FIG. 10(b) may also be used. As shown in FIG. 10(a), the belt-shaped tool has a straight portion in the circulating direction. Then, the outer peripheral shape of the straight portion shown in FIG. 10(b) is coincident with or similar to part of the outer peripheral shape of the convex tooth pin 12b.

Figure 11A:
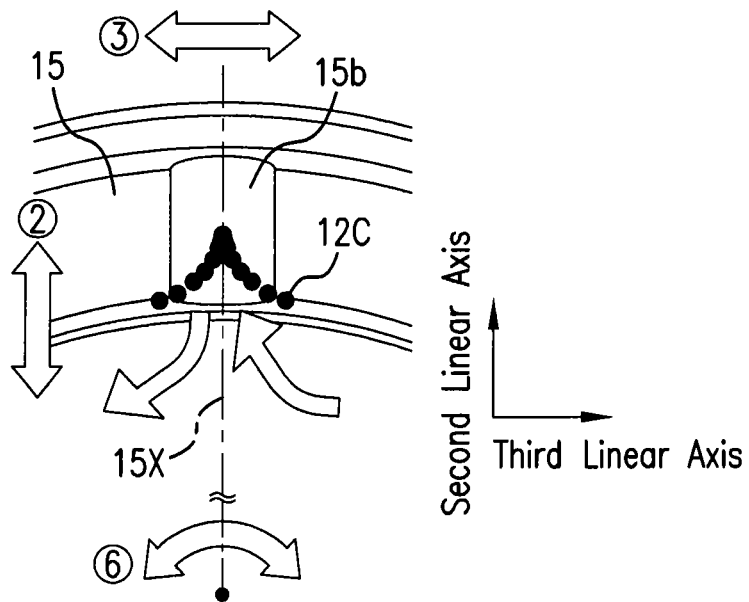
FIG. 11(a) and FIG. 11(b) are views that illustrate a required axis configuration of a machine tool in the first embodiment.
Figure 11B:
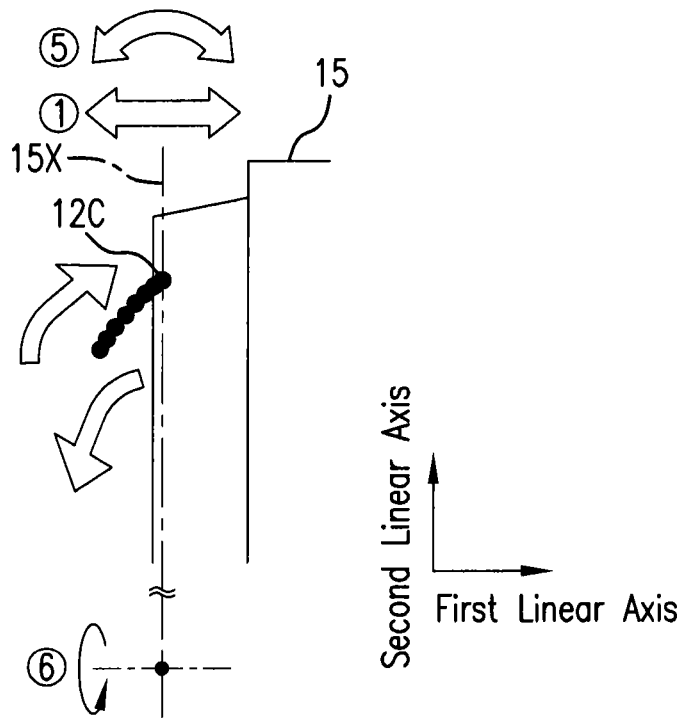

Then, in the machining step, machining is performed on the basis of the NC program subjected to coordinate conversion in the coordinate conversion step. That is, as shown in FIG. 11(a) and FIG. 11(b), the disc-shaped workpiece and the working tool are relatively moved by the five axes formed of the first linear axis, the second linear axis, the third linear axis, the fifth rotation axis (about the pin central point 12C) and the sixth indexing axis (about the rotation central axis B of the nutation gear 15) to machine the nutation concave tooth 15b. That is, when the working tool is a pin-shaped working tool, the pin-shaped working tool is moved to perform movement similar to that of the convex tooth pin 12b. In addition, in the case of the circulating belt-shaped tool, the straight portion of the tool is caused to perform movement similar to that of the pin-shaped working tool. Note that movement in the case of the toroidal grinding wheel 30 will be described in detail in other embodiments described later.

(3) Advantageous Effects of First Embodiment

According to the present embodiment, a five-axis NC machine tool is used to make it possible to machine the nutation concave teeth 15b of the nutation gear 15. That is, even when the outside diameter of the nutation gear 15 varies or the shape of each nutation concave tooth 15b varies, the nutation concave teeth 15b may be machined by the same NC machine tool.

In addition, the nutation gear 15 is a concave-convex gear that rotates about an intersecting axis with respect to a mating gear (the fixed shaft 12 or the output shaft 13). Because of such a configuration, the meshing rate of both gears increases. Therefore, it is possible to reduce size, increase strength and achieve quietness. On the other hand, in order to achieve desirable tooth contact, it is required to form a tooth flank shape having an extremely high accuracy, so there is a problem that machining of a tooth flank shape is not easy. In contrast to this, by applying the machining method according to the present embodiment, the nutation concave teeth 15b and 15c of the nutation gear 15 with an intersecting axis may be easily and highly accurately formed. As a result, it is possible to reduce machining cost in the case of accuracy equivalent to the existing art.

Here, because the number of teeth Z1 of the convex tooth pins 12b is different from the number of teeth Z2 of the nutation concave teeth 15b, the fixed shaft 12 and the nutation gear 15 are configured to be able to reliably perform differential rotation. Then, because the number of teeth is different therebetween, the shape of each of the nutation concave teeth 15b is an extremely complex shape as shown in FIG. 2 to FIG. 4.

Furthermore, movement along the fourth rotation axis is omitted to make it possible to allow machining with five axes. Thus, the number of component axes of a machine tool that is able to machine the nutation concave teeth 15b may be reduced, so it is possible to reduce the cost of the machine tool.

Furthermore, the sectional shape of the convex tooth pin 12b in the direction orthogonal to the reference axis is a circular arc shape. By so doing, the fixed shaft 12 and the nutation gear 15 are able to extremely smoothly perform differential rotation. On the other hand, machining of the nutation concave teeth 15b of the nutation gear 15 becomes complicated. Because the sectional shape of the convex tooth pin 12b in the direction orthogonal to the reference axis is a circular arc shape, each of the nutation concave teeth 15b has a sectional shape approximate to a circular arc concave shape as a whole, and, specifically, has a sectional shape of which the opening edge portions of the circular arc concave shape are sagged. In this way, even when each of the nutation concave teeth 15b has a complex shape, according to the present embodiment, it is possible to reliably and highly accurately perform machining. As a result, it is possible to form the nutation gear 15 having high performance at low cost.

In addition, relative movement between the nutation gear 15 and the fixed shaft 12 is three-dimensionally complex movement; however, the reference axis 12X of the convex tooth pin 12b is used to thereby make it possible to reliably understand the relative movement trajectory of the convex tooth pin 12b.

In addition, when the working tool has a shape that is coincident with or similar to the convex tooth pin 12b, movement of the working tool is set so as to be substantially similar to that of the convex tooth pin 12b to thereby make it possible to form the optimal nutation concave teeth 15b. This also applies to the case where the circulating belt-shaped tool is used as the working tool.

In addition, the relative movement trajectory of the convex tooth pin 12b is converted to movement of the working tool in the workpiece coordinate system. In the present embodiment, the movement of the convex tooth pin 12b is caused to substantially coincide with the movement of the pin-shaped working tool. Thus, the movement trajectory of the convex tooth pin 12b, extracted in the trajectory extracting step, and the NC program are not substantially significantly different from each other. However, depending on the type of working tool, the relative movement trajectory extracted in the trajectory extracting step and the movement trajectory of the working tool in the workpiece coordinate system may differ from each other. That is, by providing the coordinate conversion step, the NC program based on the type of working tool may be generated. This point is particularly effective in other embodiments.

Second Embodiment

Five-Axis Configuration (Three Linear Axes and Two Rotation Axes) (Second Example of Omission of Fourth Rotation Axis)

A machining method and machining device for a nutation gear of a nutation gear set according to a second embodiment will be described with reference to FIG. 12. The machining device in the present embodiment shows the case of a five-axis configuration having three orthogonal linear axes and two rotation axes. As in the case of the first embodiment, the fourth rotation axis is omitted. However, in the present embodiment, movement along the fourth rotation axis described in the first embodiment is decomposed not into movement along the sixth indexing axis and movement along the third linear axis but into movement along the sixth indexing axis and movement along the second linear axis.

Here, in the present embodiment, "model generation" (S1) and "trajectory extracting step" (S2) in the first embodiment are the same. That is, the movement trajectory of the convex tooth pin 12b, extracted in the trajectory extracting step, is expressed by the three linear axes and the three rotation axes.

Subsequently, in the coordinate conversion step, in the present embodiment, first, the process of decomposing movement along the fourth rotation axis into movement along the sixth indexing axis and movement along the second linear axis to omit movement along the fourth rotation axis is executed. Here, as is described in the first embodiment, the fourth rotation axis is an axis that rotates about an axis parallel to the sixth indexing axis. Then, as shown in FIG. 12, the center of the fourth rotation axis, that is, the pin central point 12C of the convex tooth pin 12b, is brought into coincidence with the rotation center of the sixth indexing axis (the rotation central axis B of the nutation gear 15). At this time, at the time of shifting the pin central point 12C of the convex tooth pin 12b, the pin central point 12C is shifted along the reference axis 12X of the convex tooth pin 12b. That is, the rotation center of the shifted fourth rotation axis moves along the second linear axis. In this way, movement along the fourth rotation axis is decomposed into the sixth indexing axis and the second linear axis to thereby make it possible to omit the movement of the fourth rotation axis. As a result, the relative movement trajectory of the convex tooth pin 12b is expressed by three linear axes and two rotation axes.

Furthermore, subsequently, in the coordinate conversion step, an NC program expressed by the three linear axes and the two rotation axes is generated on the basis of the calculated movement trajectories of the three linear axes, that is, the first linear axis, the second linear axis and the third linear axis, and the two rotation axes, that is, the fifth rotation axis and the sixth indexing axis. Note that, the subject machine tool in the present embodiment has a machine configuration having first to third, fifth and sixth axes.

Subsequently, in the machining step, as in the case of the first embodiment, a tool having a pin shape that coincides with the outer peripheral shape of the convex tooth pin 12b is assumed as the working tool. Then, in the machining step, machining is performed on the basis of the five-axis configuration NC program subjected to coordinate conversion in the coordinate conversion step. That is, as shown in FIG. 12, the disc-shaped workpiece and the working tool are relatively moved by the five axes formed of the first linear axis, the second linear axis, the third linear axis, the fifth rotation axis (about the pin central point 12C) and the sixth indexing axis (about the rotation central axis B of the nutation gear 15) to machine the nutation concave tooth 15b.

In this way, according to the present embodiment, movement along the fourth rotation axis is omitted to make it possible to allow machining with five axes. Thus, the number of component axes of a machine tool that is able to machine the nutation concave teeth 15b may be reduced, so it is possible to reduce the cost of the machine tool.

Third Embodiment

Four-Axis Configuration (Two Linear Axes and Two Rotation Axes) (Omission of Second Linear Axis and Fourth Rotation Axis)

A machining method and machining device for a nutation gear of a nutation gear set according to a third embodiment will be described with reference to FIG. 7, FIG. 8 and FIG. 13 to FIG. 15. The machining device in the present embodiment shows the case of a four-axis configuration having two orthogonal linear axes and two rotation axes. The fourth rotation axis and the second linear axis that are described in the first embodiment with reference to FIG. 7(a) and FIG. 7(b) are omitted. Specifically, as in the case of the first embodiment, movement along the fourth rotation axis is decomposed into movement along the sixth indexing axis and movement along the third linear axis, and, in addition, movement along the second linear axis is decomposed into the first linear axis and the third linear axis.

Here, in the present embodiment, "model generation" (S1) and "trajectory extracting step" (S2) in the first embodiment are the same. That is, the movement trajectory of the convex tooth pin 12b, extracted in the trajectory extracting step, is expressed by the three linear axes and the three rotation axes.

Subsequently, in the coordinate conversion step, first, as described in the first embodiment, as shown in FIG. 8, in the trajectory extracting step, the process of decomposing movement along the fourth rotation axis into movement along the sixth indexing axis and movement along the third linear axis to omit movement along the fourth rotation axis is executed. That is, at this time point, the relative movement trajectory of the convex tooth pin 12b is expressed by the three linear axes and the two rotation axes.

Figure 13A:
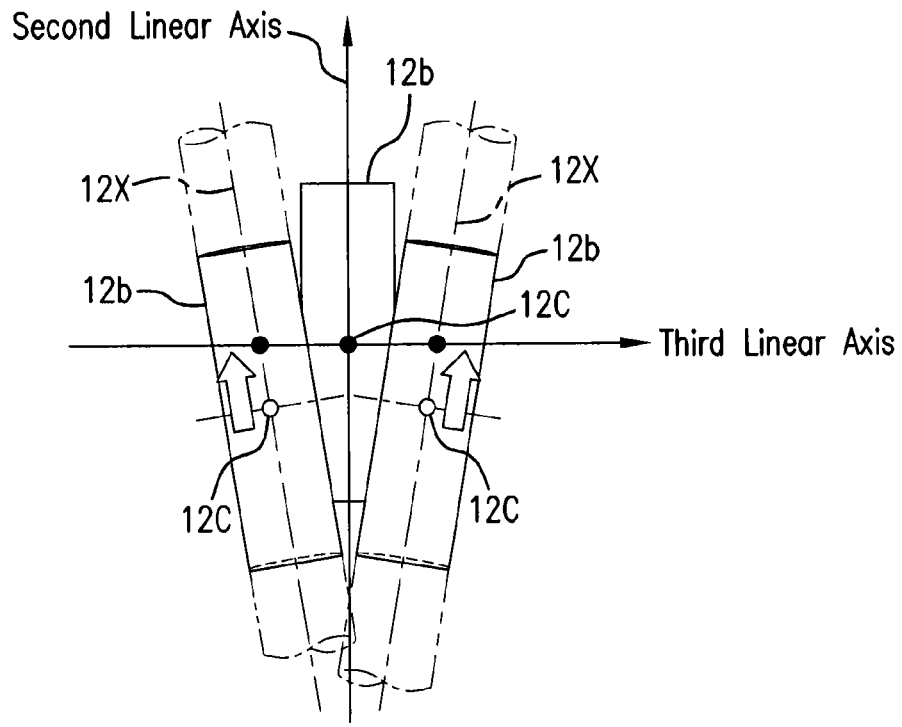
FIG. 13(a) and FIG. 13(b) are conceptual explanatory views in the case where movement along the second linear axis is decomposed into movement along the first linear axis and movement along the third linear axis in a third embodiment.
Figure 13B:
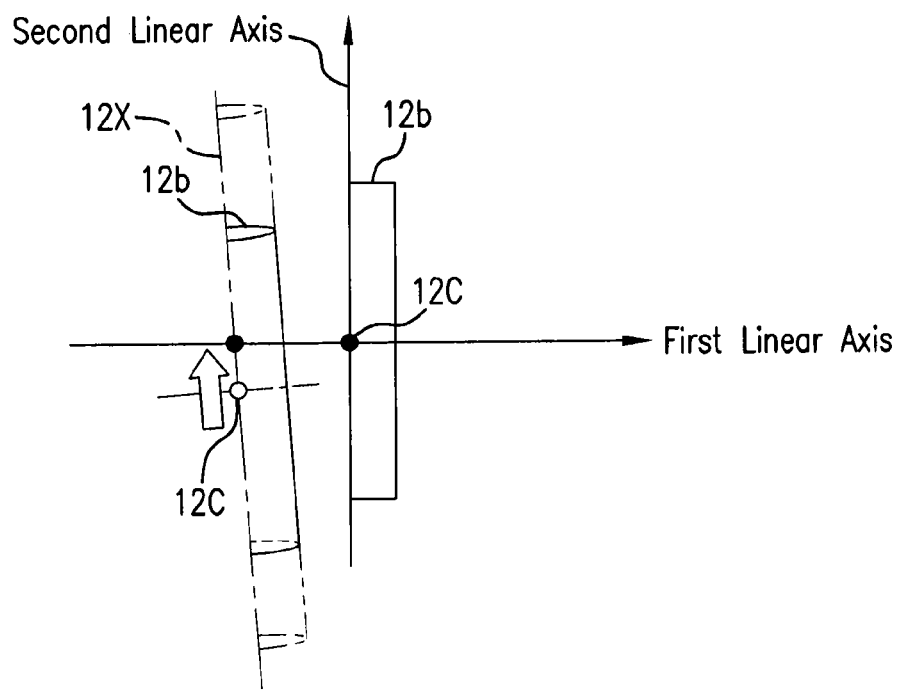
Figure 14A:
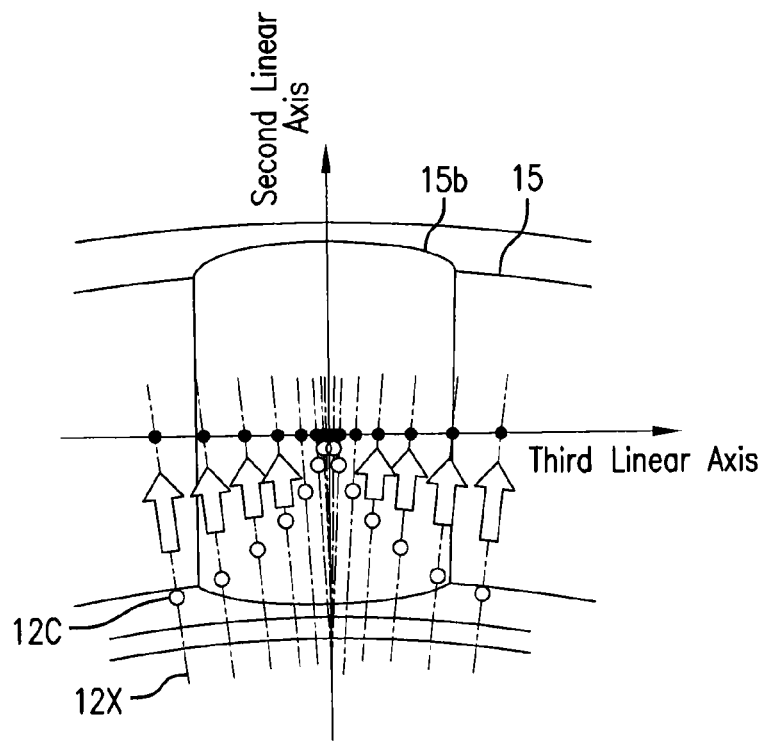
FIG. 14(a) and FIG. 14(b) are conceptual explanatory views in the case where the central position of the convex tooth pin is decomposed into components in the third embodiment.
Figure 14B:
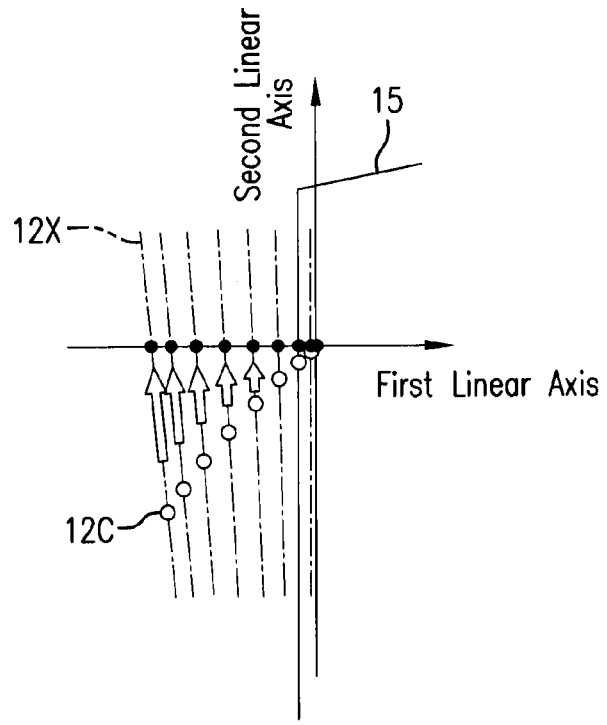

Furthermore, in the present embodiment, in the coordinate conversion step, the process of omitting movement along the second linear axis is executed. The outline of this process will be described with reference to FIG. 13(a) and FIG. 13(b). As shown in FIG. 13(a) and FIG. 13(b), it is presumed that the tooth length of the convex tooth pin 12b is infinite, and the pin central point 12C of the convex tooth pin 12b is shifted along the reference axis 12X of the convex tooth pin 12b. Furthermore, the pin central point 12C of the convex tooth pin 12b is shifted into the plane that passes through the first linear axis and the third linear axis. The details of this point are shown in FIG. 14(a) and FIG. 14(b). The pin central points 12C each are shifted into the plane that passes through the first linear axis and the third linear axis. In this way, when movement along the second linear axis is decomposed into movement along the first linear axis and movement along the third linear axis, movement along the second linear axis may be omitted.

Note that, in the above description, for the sake of easy description, a processing method in which the fourth rotation axis is omitted first and then the second linear axis is omitted is described; instead, the processes of omitting the axes may be reversed, and the same result may be obtained. In addition, as for the process, the process of omitting the fourth rotation axis and the process of omitting the second linear axis may be executed simultaneously.

Figure 15A:
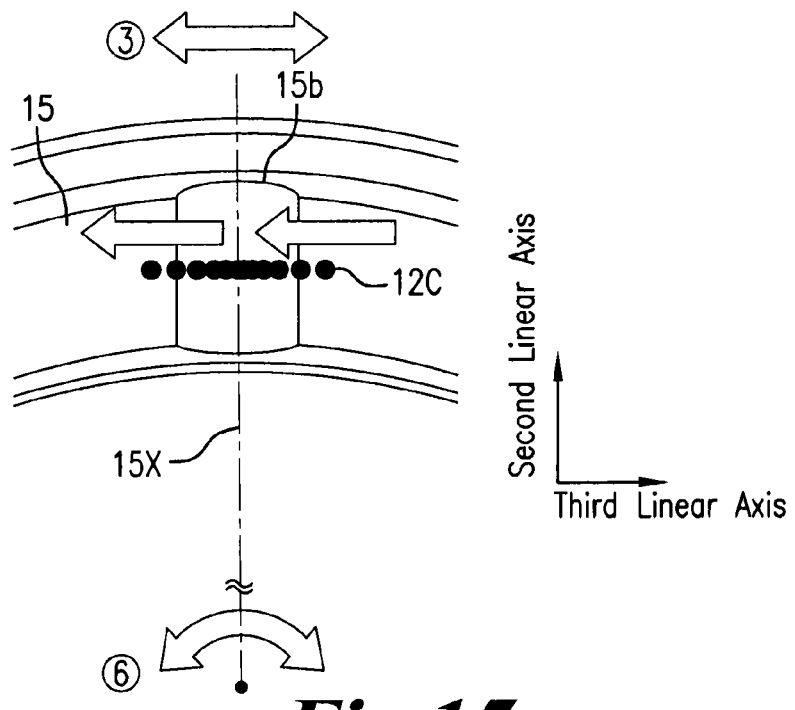
FIG. 15(a) and FIG. 15(b) are views that illustrate a required axis configuration of a machine tool in the third embodiment.
Figure 15B:
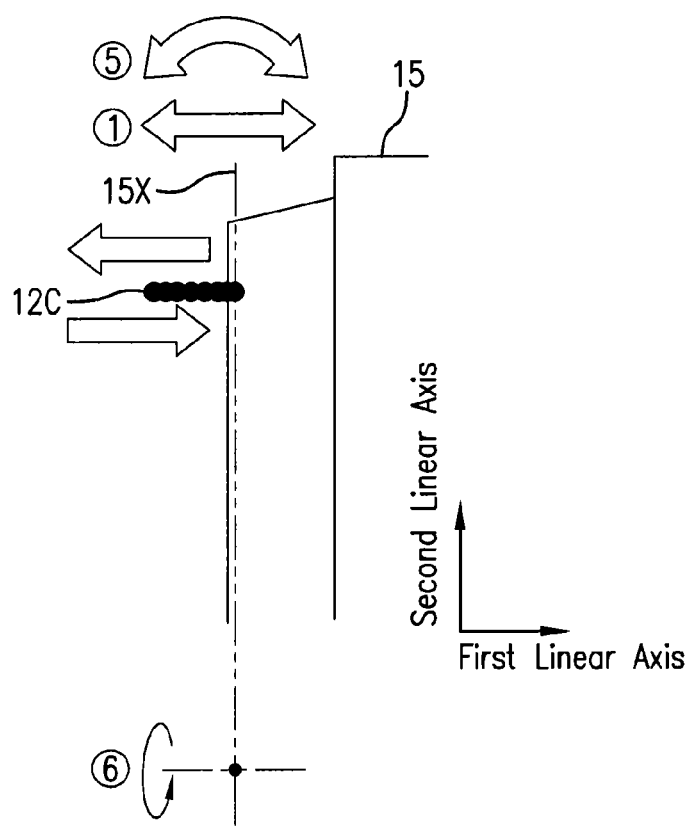

Thus, in the present embodiment, the second linear axis is further omitted in addition to the fourth rotation axis with respect to the first embodiment from the relative movement trajectory of the convex tooth pin 12b. That is, as shown in FIG. 15(a) and FIG. 15(b), the finally obtained relative movement trajectory of the convex tooth pin 12b is expressed by the two linear axes, that is, the first linear axis and the third linear axis, and the two rotation axes, that is, the fifth rotation axis and the sixth indexing axis.

Furthermore, subsequently, in the coordinate conversion step, an NC program expressed by the two linear axes and the two rotation axes is generated on the basis of the calculated movement trajectories of the two linear axes, that is, the first linear axis and the third linear axis, and the two rotation axes, that is, the fifth rotation axis and the sixth indexing axis. Note that, the subject machine tool in the present embodiment has a machine configuration having first, third, fifth and sixth axes.

Subsequently, in the machining step, as in the case of the first embodiment, a tool having a pin shape that coincides with the outer peripheral shape of the convex tooth pin 12b is assumed as the working tool. Then, in the machining step, machining is performed on the basis of the four-axis configuration NC program subjected to coordinate conversion in the coordinate conversion step. That is, as shown in FIG. 15(a) and FIG. 15(b), the disc-shaped workpiece and the working tool are relatively moved by the four axes formed of the first linear axis, the third linear axis, the fifth rotation axis (about the pin central point 12C) and the sixth indexing axis (about the rotation central axis B of the nutation gear 15) to machine the nutation concave tooth 15b.

In this way, according to the present embodiment, movement along the fourth rotation axis and movement along the second linear axis are omitted to make it possible to allow machining with four axes. Thus, the number of component axes of a machine tool that is able to machine the nutation concave teeth 15b may be reduced, so it is possible to reduce the cost of the machine tool.

Fourth Embodiment

Four-Axis Configuration (Two Linear Axes and Two Rotation Axes) (Omission of Third Linear Axis and Fourth Rotation Axis)

A machining method and machining device for a nutation gear of a nutation gear set according to a fourth embodiment will be described with reference to FIG. 12, and FIG. 16 to FIG. 18. The machining device in the present embodiment shows the case of a four-axis configuration having two orthogonal linear axes and two rotation axes. The fourth rotation axis and the third linear axis that are described in the first embodiment with reference to FIG. 7 are omitted. Specifically, as in the case of the second embodiment, movement along the fourth rotation axis is decomposed into movement along the sixth indexing axis and movement along the second linear axis, and, in addition, movement along the third linear axis is decomposed into the first linear axis and the second linear axis.

Here, in the present embodiment, "model generation" (S1) and "trajectory extracting step" (S2) in the first embodiment are the same. That is, the movement trajectory of the convex tooth pin 12b, extracted in the trajectory extracting step, is expressed by the three linear axes and the three rotation axes.

Figure 12:
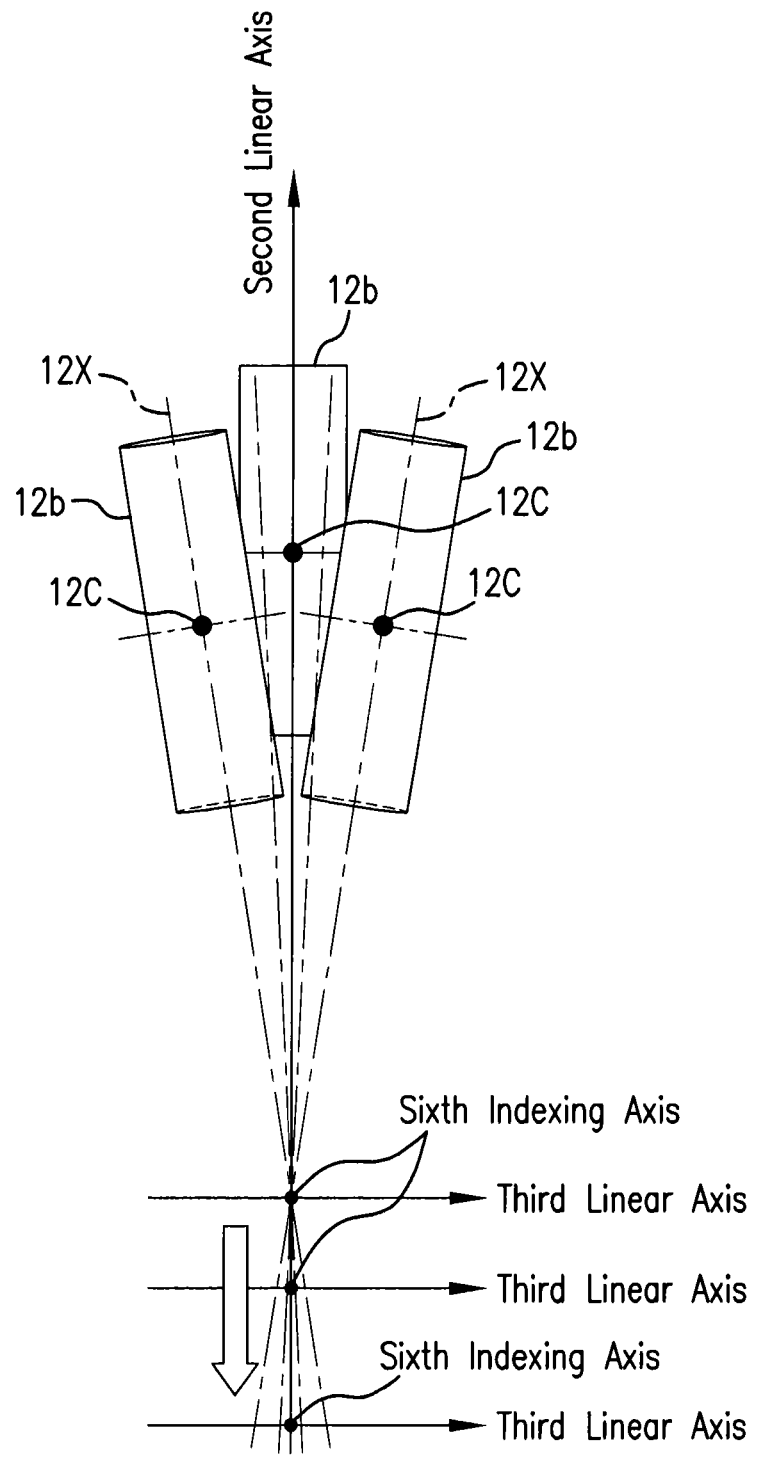
FIG. 12 is an explanatory view in the case where movement along the fourth rotation axis is decomposed into movement along the sixth indexing axis and movement along the second linear axis in a second embodiment. That is.

Subsequently, in the coordinate conversion step, first, as described in the second embodiment, as shown in FIG. 12, in the trajectory extracting step, the process of decomposing movement along the fourth rotation axis into movement along the sixth indexing axis and movement along the second linear axis to omit movement along the fourth rotation axis is executed. That is, at this time point, the relative movement trajectory of the convex tooth pin 12b is expressed by the three linear axes and the two rotation axes.

Figure 17A:
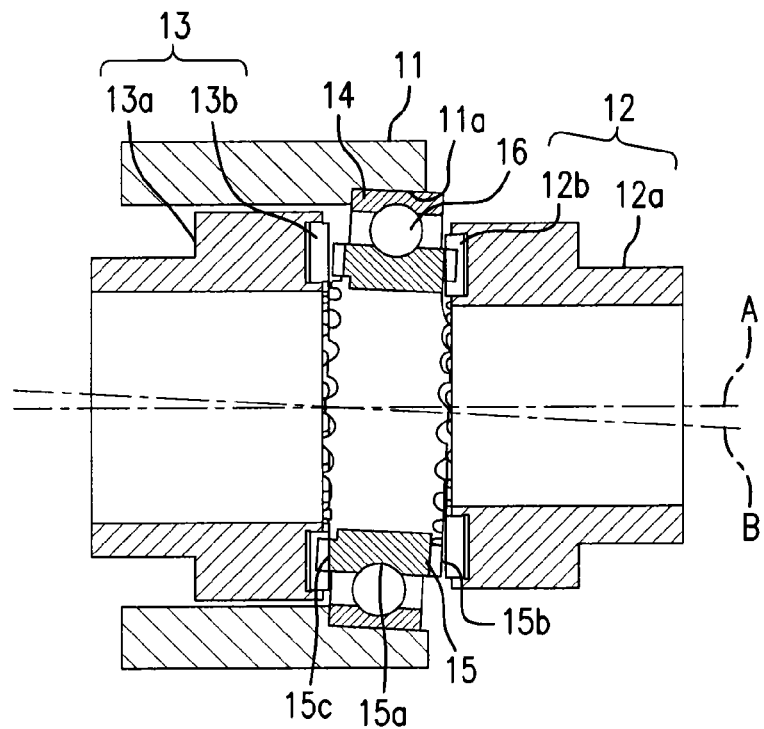
FIG. 17(a) and FIG. 17(b) are views in the case where the central position of the convex tooth pin is decomposed into components in the fourth embodiment.
Figure 17B:
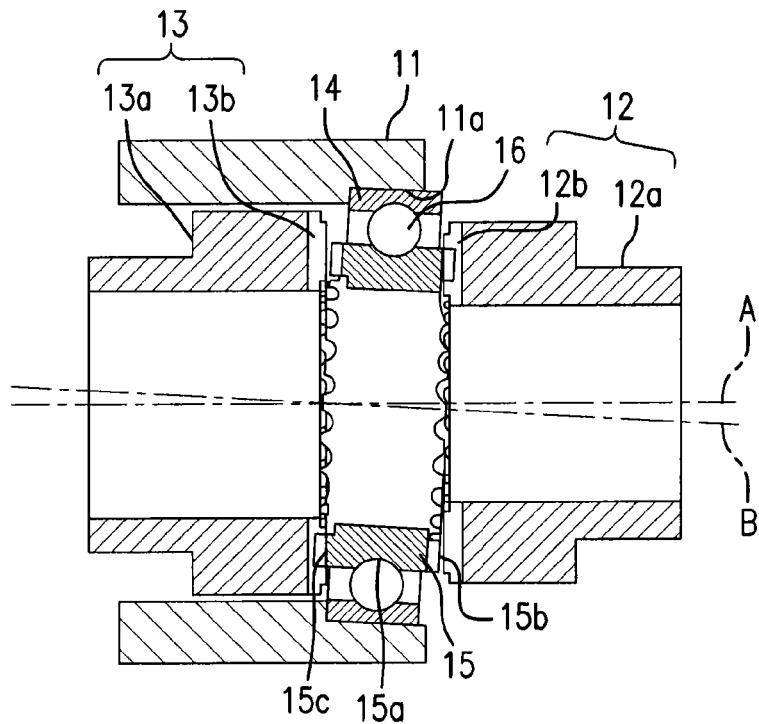

Furthermore, in the present embodiment, in the coordinate conversion step, the process of omitting movement along the third linear axis is executed. The outline of this process will be described with reference to FIG. 16(a) and FIG. 16(b). As shown in FIG. 16(a) and FIG. 16(b), it is presumed that the tooth length of the convex tooth pin 12b is infinite, and the pin central point 12C of the convex tooth pin 12b is shifted along the reference axis 12X of the convex tooth pin 12b. Furthermore, the pin central point 12C of the convex tooth pin 12b is shifted into the plane that passes through the first linear axis and the second linear axis. The details of this point are shown in FIG. 17(a) and FIG. 17(b). The pin central points 12C each are shifted into the plane that passes through the first linear axis and the second linear axis. In this way, when movement along the third linear axis is decomposed into movement along the first linear axis and movement along the second linear axis, movement along the third linear axis may be omitted.

Note that, in the above description, for the sake of easy description, a processing method in which the fourth rotation axis is omitted first and then the third linear axis is omitted is described; instead, the processes of omitting the axes may be reversed, and the same result may be obtained. In addition, as for the process, the process of omitting the fourth rotation axis and the process of omitting the third linear axis may be executed simultaneously.

Figure 18A:
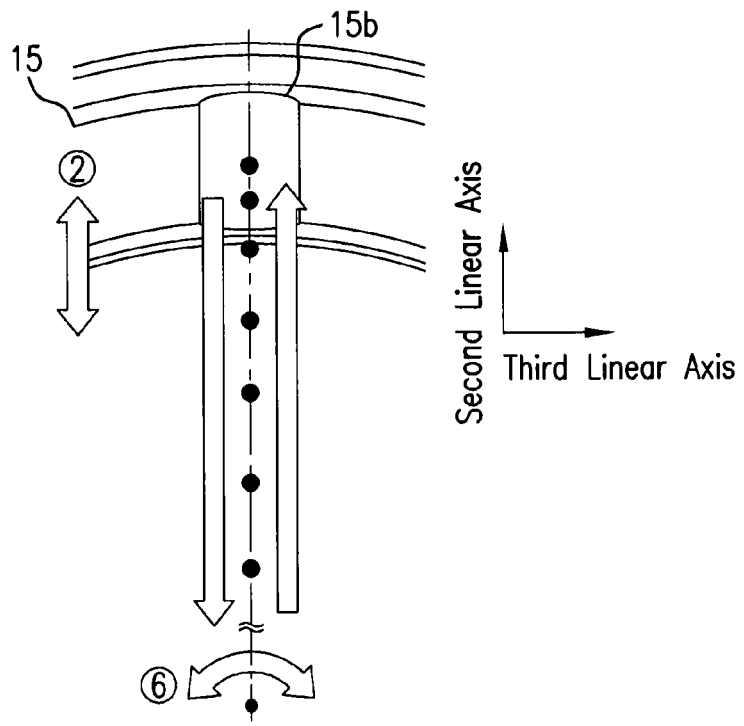
FIG. 18(a) and FIG. 18(b) are views that illustrate a required axis configuration of a machine tool in the fourth embodiment.
Figure 18B:
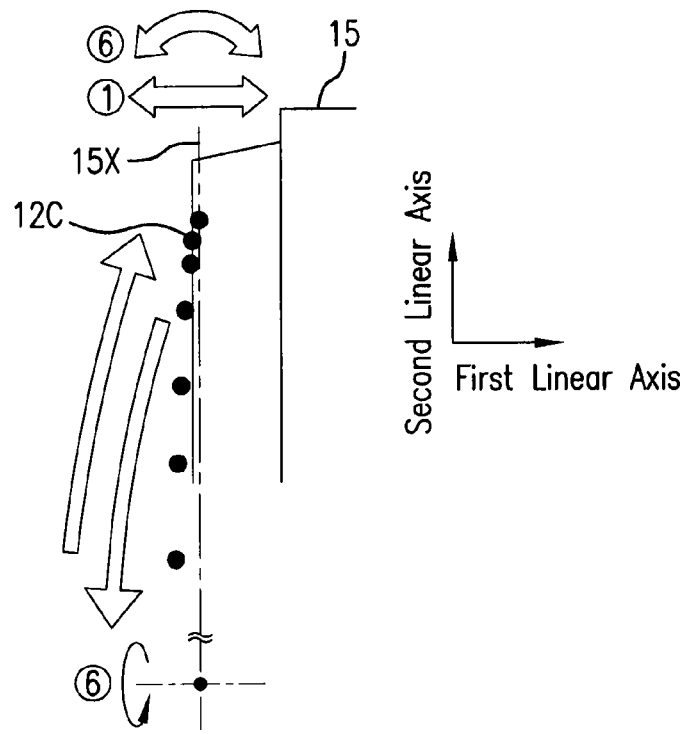

Thus, in the present embodiment, the third linear axis is further omitted in addition to the fourth rotation axis with respect to the first embodiment from the relative movement trajectory of the convex tooth pin 12b. That is, as shown in FIG. 18(a) and FIG. 18(b), the finally obtained relative movement trajectory of the convex tooth pin 12b is expressed by the two linear axes, that is, the first linear axis and the second linear axis, and the two rotation axes, that is, the fifth rotation axis and the sixth indexing axis.

Furthermore, subsequently, in the coordinate conversion step, an NC program expressed by the two linear axes and the two rotation axes is generated on the basis of the calculated movement trajectories of the two linear axes, that is, the first linear axis and the second linear axis, and the two rotation axes, that is, the fifth rotation axis and the sixth indexing axis. Note that, the subject machine tool in the present embodiment has a machine configuration having first, second, fifth and sixth axes.

Subsequently, in the machining step, as in the case of the second embodiment, a tool having a pin shape that coincides with the outer peripheral shape of the convex tooth pin 12b is assumed as the working tool. Then, in the machining step, machining is performed on the basis of the four-axis configuration NC program subjected to coordinate conversion in the coordinate conversion step. That is, as shown in FIG. 18(a) and FIG. 18(b), the disc-shaped workpiece and the working tool are relatively moved by the four axes formed of the first linear axis, the second linear axis, the fifth rotation axis (about the pin central point 12C) and the sixth indexing axis (about the rotation central axis B of the nutation gear 15) to machine the nutation concave tooth 15b.

In this way, according to the present embodiment, movement along the fourth rotation axis and movement along the third linear axis are omitted to make it possible to allow machining with four axes. Thus, the number of component axes of a machine tool that is able to machine the nutation concave teeth 15b may be reduced, so it is possible to reduce the cost of the machine tool.

Fifth Embodiment

Four-Axis Configuration (Three Linear Axes and One Rotation Axis) and Toroidal Grinding Wheel A machining method and machining device for a nutation gear of a nutation gear set according to a fifth embodiment will be described with reference to FIG. 7 to FIG. 9, FIG. 12, and FIG. 19 to FIG. 22. The machining device in the present embodiment shows the case of a four-axis configuration having three orthogonal linear axes and one rotation axis. The fourth rotation axis and the fifth rotation axis that are described in the first embodiment with reference to FIG. 7 are omitted. Specifically, as in the case of the first embodiment, movement along the fourth rotation axis is decomposed into movement along the sixth indexing axis and movement along the second linear axis, and, in addition, movement along the fifth rotation axis is decomposed into the first linear axis and the second linear axis. In addition to this, a toroidal grinding wheel (disc-shaped tool) is used as the working tool.

(4) Machining Method and Machining Device for Nutation Gear (4.1) Basic Concept of Machining Method for Nutation Gear The basic concept of the machining method for the nutation concave teeth 15b of the nutation gear 15 in the nutation gear set will be described. In the machining method in the present embodiment, the toroidal grinding wheel 30 shown in FIG. 9 is used. The toroidal grinding wheel 30 is a disc-shaped tool shown in FIG. 9(a), and its outer peripheral edge shape is a circular arc convex shape shown in FIG. 9(b).

Figure 19:
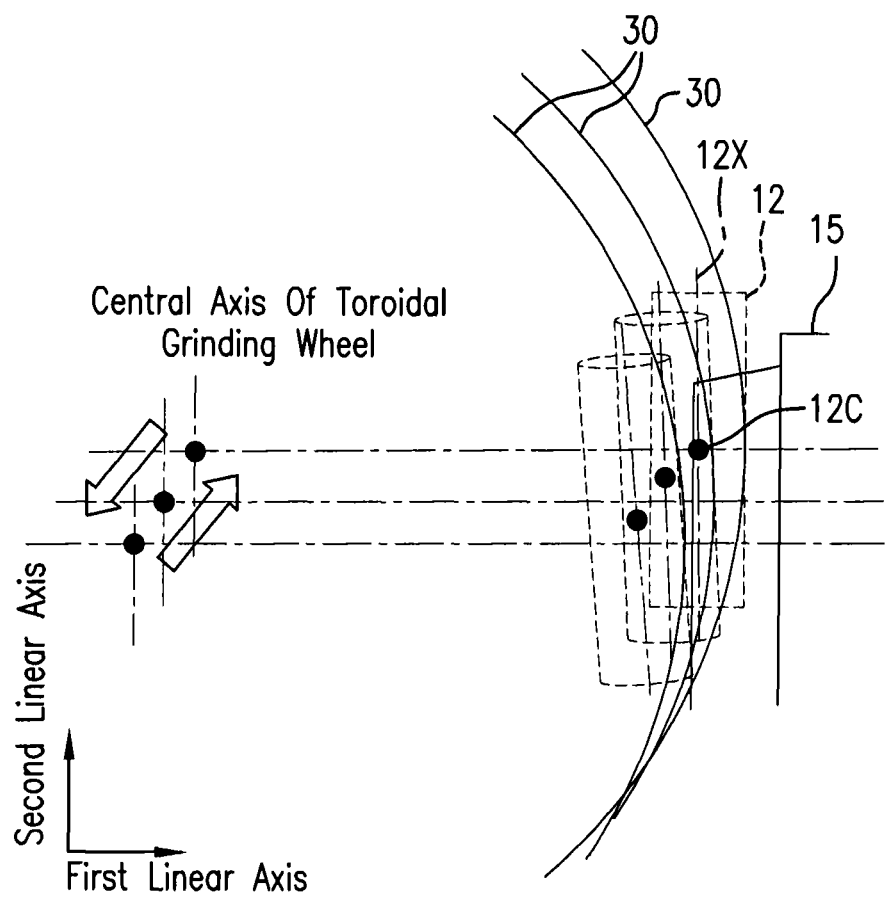
FIG. 19 is a view that shows movement of the rotation axis of the toroidal grinding wheel in the plane parallel to the first linear axis and the second linear axis in a fifth embodiment.
Figure 20A:
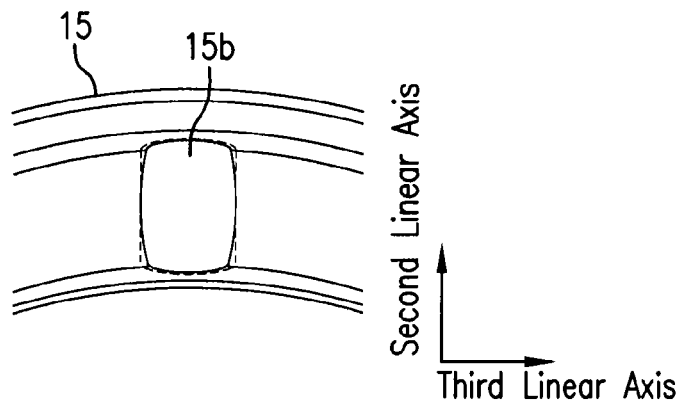
FIG. 20(a) and FIG. 20(b) are views that show the machined shape of a nutation concave tooth in the case where the toroidal grinding wheel undergoes cutting operation at one cutting position with respect to a tooth groove direction of the nutation concave tooth in the fifth embodiment.
Figure 20B:
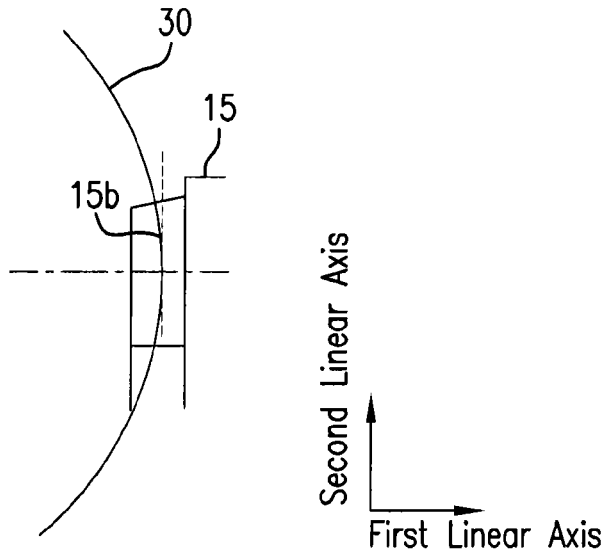

When the toroidal grinding wheel 30 is used to machine the nutation concave teeth 15b, movement shown in FIG. 19 is allowed. That is, the fifth rotation axis described in the first embodiment with reference to FIG. 7(b) may be expressed by the first linear axis and the second linear axis owing to the toroidal grinding wheel 30. However, when a series of movements (movement corresponding to the movement trajectory of the convex tooth pin 12b) of the toroidal grinding wheel 30 with respect to the nutation concave tooth 15b is performed once, as shown in FIG. 20(a) and FIG. 20(b), a cutting remainder occurs at the nutation concave tooth 15b.

Figure 21:
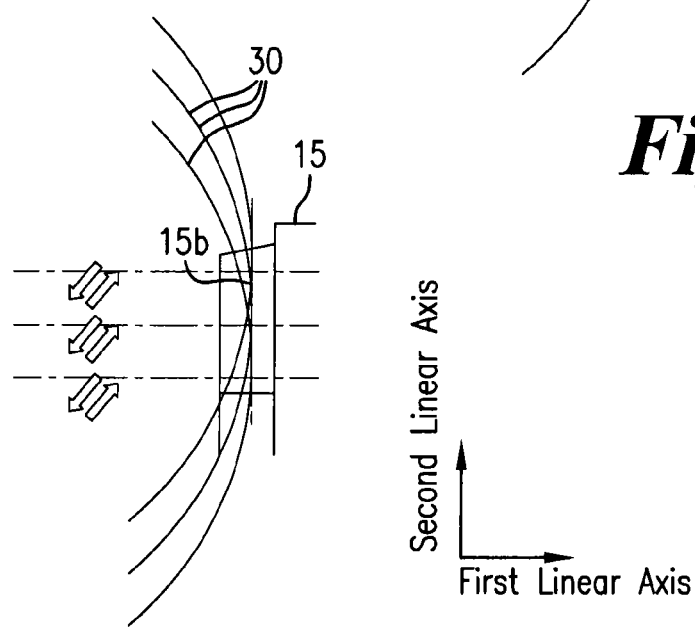
FIG. 21 is an explanatory view in the case where the toroidal grinding wheel undergoes cutting operation at three cutting positions with respect to the tooth groove direction of the nutation concave tooth in the fifth embodiment.

Then, as shown in FIG. 21, through cutting operation at multiple portions at which the central axis of the toroidal grinding wheel 30 is shifted in the tooth groove direction of the nutation concave tooth 15b, the convex tooth pin 12b is spuriously expressed by the toroidal grinding wheel 30. As a result, it is possible to reduce a cutting remainder of the nutation concave tooth 15b. FIG. 21 shows an example in which cutting operation is performed at three positions. In this way, a series of movements of the toroidal grinding wheel 30 is performed at multiple cutting operation positions to thereby make it possible to machine the nutation concave tooth 15b with further high accuracy.

Figure 22:
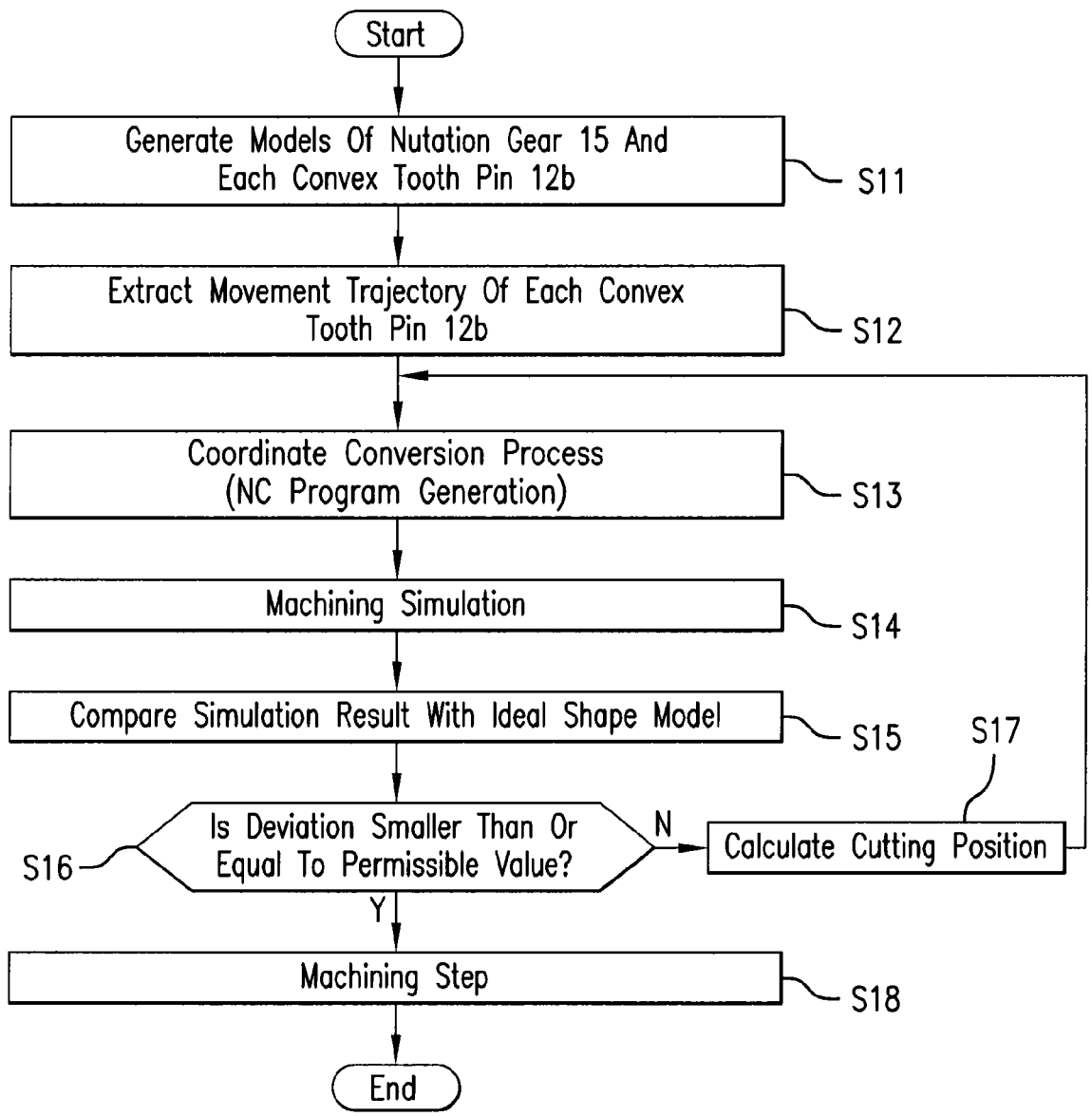
FIG. 22 is a flow chart that shows processes in the fifth embodiment.

In consideration of this basic concept, the procedure of the machining method according to the present embodiment will be descried with reference to FIG. 22. As shown in FIG. 22, three-dimensional CAD models of the nutation gear 15 and each convex tooth pin 12b are generated (S11). This model is a movement model in which the nutation gear 15 and the fixed shaft 12 perform differential rotation.

Subsequently, the relative movement trajectory of each convex tooth pin 12b with respect to a corresponding one of the nutation concave teeth 15b at the time when both perform differential rotation is extracted (S12) ("trajectory extracting step", "trajectory extracting means"). At the time of extracting the relative movement trajectories, first, the same process as the process in the trajectory extracting step is executed. That is, in the trajectory extracting step, the relative movement trajectories of the reference axis 12X and pin central point 12C of the convex tooth pin 12b with respect to the nutation gear 15 are extracted. That is, at this time point, the movement trajectory of the convex tooth pin 12b, extracted in the trajectory extracting step, is expressed by the three linear axes and the three rotation axes.

Subsequently, the extracted relative movement trajectory of the convex tooth pin 12b with respect to the nutation gear 15 is subjected to coordinate conversion to generate an NC program that is the movement trajectory of the toroidal grinding wheel 30 (S13) ("coordinate conversion step", "coordinate conversion means").

First, in the coordinate conversion step, as described in the first embodiment or the second embodiment, as shown in FIG. 8 or FIG. 12, the process of decomposing movement along the fourth rotation axis into movement along the sixth indexing axis and movement along the third linear axis (or the second linear axis) to omit movement along the fourth rotation axis is executed. That is, at this time point, the relative movement trajectory of the convex tooth pin 12b is expressed by the three linear axes and the two rotation axes.

Furthermore, in the present embodiment, in the coordinate conversion step, the process of omitting movement along the fifth rotation axis is executed. As described above, this process is achieved by using the toroidal grinding wheel 30. That is, at this time point, the relative movement trajectory of the convex tooth pin 12b is expressed by the three linear axes and the one rotation axis. Here, at this time point, the position of cutting operation of the toroidal grinding wheel 30 in the tooth groove direction is set at one portion. Furthermore, subsequently, the calculated relative movement trajectory of the convex tooth pin 12b with respect to the nutation gear 15 is subjected to coordinate conversion to generate an NC program that is the movement trajectory of the working tool.

Subsequently, the toroidal grinding wheel 30 and the disc-shaped workpiece (nutation gear 15) are relatively moved to perform machining simulation (S14) ("simulation step", "simulation means"). That is, the toroidal grinding wheel 30 is moved in accordance with the generated NC program with respect to the disc-shaped workpiece before the nutation concave teeth 15b are machined to generate the shape of the machined disc-shaped workpiece through machining simulation.

Subsequently, a preset ideal shape model is compared with the shape of the result of machining simulation to calculate a deviation (S15). Subsequently, it is determined whether the calculated deviation is smaller than or equal to a preset allowable value (S16).

Then, when the calculated deviation exceeds the allowable value (N in S16), the position of cutting operation is calculated by shifting the central axis of the toroidal grinding wheel 30 in the tooth groove direction of the nutation concave tooth 15b (S17) ("cutting position calculation step"). Here, for example, cutting operation is performed such that the central axis of the toroidal grinding wheel 30 is shifted to two portions in the tooth groove direction of the nutation concave tooth 15b. Here, in the cutting position calculation step, the position of cutting operation is calculated so that a deviation between the shape of the result of machining simulation and the ideal shape model reduces and a machining time reduces.

When calculation of the position of cutting operation is completed, the process returns to step S13, and coordinate conversion process is executed again on the basis of the calculated position of cutting operation. That is, through a repetition of step S13 to step S17, in the cutting position calculation step, the position of cutting operation is calculated so that a deviation between the shape of the result of machining simulation and the ideal shape model is smaller than or equal to the set allowable value and a machining time is minimized.

Then, when the calculated deviation is smaller than or equal to the allowable value (Y in S16), at least one of the disc-shaped workpiece and the toroidal grinding wheel 30 is moved on the basis of the generated NC program (S18) ("machining step", "machining means").

In this way, according to the present embodiment, by using the toroidal grinding wheel 30, movement along the fourth rotation axis and movement along the fifth rotation axis are omitted to make it possible to allow machining with four axes. Thus, the number of component axes of a machine tool that is able to machine the nutation concave teeth 15b may be reduced, so it is possible to reduce the cost of the machine tool. However, on the contrary, by using the toroidal grinding wheel 30, a geometrical deviation, that is, cutting remainder, occurs. Then, machining simulation is performed and then comparison is made with the ideal shape model to thereby make it possible to reliably form the nutation concave teeth 15b with high accuracy. Furthermore, a machining condition with a shortest period of time may be calculated.

Note that, as long as at least a four-axis configuration formed of the three linear axes and the one rotation axis described in the present embodiment is provided, the toroidal grinding wheel 30 is used to make it possible to machine the nutation concave teeth 15b of the nutation gear 15. That is, in the first embodiment (five-axis configuration formed of the three linear axes and the two rotation axes) as well, machining using the toroidal grinding wheel 30 is allowed.

Sixth Embodiment

In the above first to fifth embodiments, the machining method in which the nutation gear of the nutation gear set is set as a machining target is described. The nutation gear set is configured to include two sets of the relationship between the concave-convex gear and the mating gear of which the respective rotation central axes intersect with each other. A torque transmission device that is configured to include a set of the above relationship between the concave-convex gear and the mating gear will be described with reference to FIG. 23(a) and FIG. 23(b).

Figure 23A:
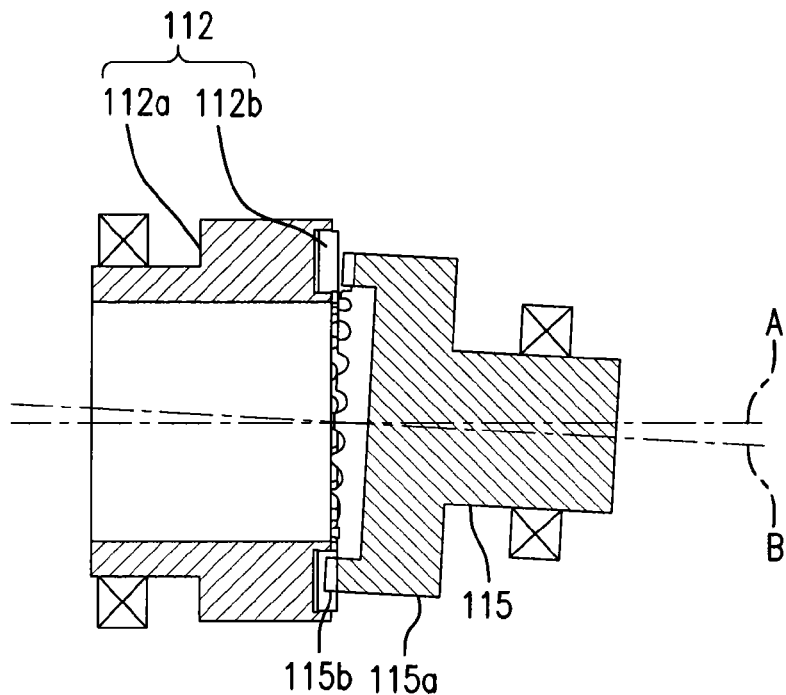
FIG. 23(a) and FIG. 23(b) are sectional views of a torque transmission device formed of a concave-convex gear with an intersecting axis in a sixth embodiment.
Figure 23B:
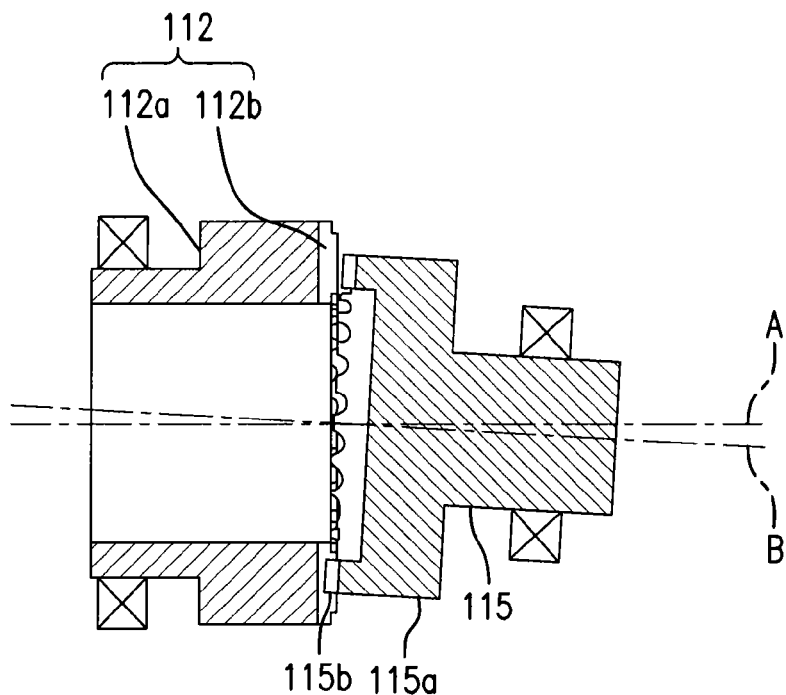

Here, FIG. 23(a) shows a case where convex tooth pins 112b are separately formed from an input shaft body 112a, and FIG. 23(b) shows a case where the convex tooth pins 112b are integrally formed with the input shaft body 112a.

As shown in FIG. 23(a) and FIG. 23(b), the torque transmission device is formed of an input shaft 112 and an output shaft 115. The input shaft 112 (that corresponds to a "mating gear" of the invention) is formed of substantially similar configuration to that of the output shaft 13 in the first embodiment. The input shaft 112 is formed of the input shaft body 112a and the plurality of convex tooth pins 112b. The input shaft body 112a (that corresponds to a "mating gear body" of the invention) is a cylindrical member having an axis A as a rotation central axis. Then, the input shaft body 112a is supported by a housing (not shown) via a bearing so as to be rotatable about the rotation central axis A.

The output shaft 115 (that corresponds to a "concave-convex gear" of the invention) has substantially the same shape of one of the end faces of the inner ring (nutation gear) 15 in the first embodiment. That is, a plurality (G2) of concave teeth 115b are formed on an axially one (left side in FIG. 23(a) and FIG. 23(b)) end face of the output shaft 115 at equal intervals in the circumferential direction. The output shaft 115 is supported by the housing (not shown) via a bearing so as to be rotatable about a rotation central axis B inclined with respect to the rotation central axis A. Then, another torque transmission member is coupled to the axially other side (right side in FIG. 23(a) and FIG. 23(b)) of the output shaft 115.

In this way, when the concave teeth of the output shaft 115 that rotates about the rotation central axis B that intersects with the rotation central axis A of the input shaft 112 are set as a machining target, the machining method in the above described embodiments may be applied similarly. Then, similar advantageous effects are obtained.

<Others>

Figure 24:
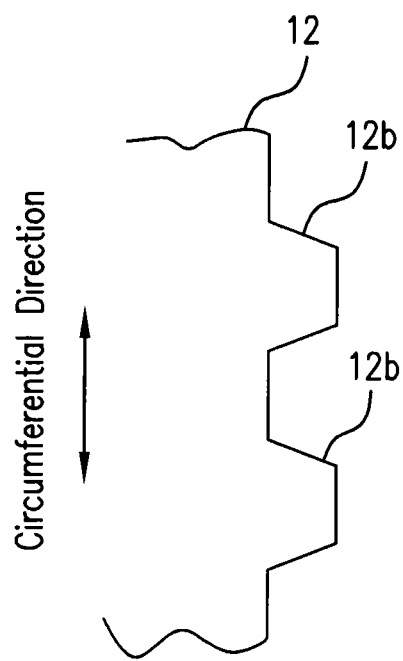
FIG. 24 is a view that shows convex teeth in another alternative embodiment.

In addition, the above embodiments are described on the assumption that the sectional shape of the convex tooth pin 12b in the direction orthogonal to the reference axis is a circular arc shape; instead, as shown in FIG. 24, it is also applicable to the case where each convex tooth pin 12b has a trapezoidal shape, an involute shape, or the like.

In addition, in the above embodiments, the relationship between the convex tooth pins 12b of the fixed shaft 12 and the nutation concave teeth 15b is described; instead, it is also similarly applicable to the relationship between the convex tooth pins 13b of the output shaft 13 and the nutation concave teeth 15c.

The invention claimed is:

1. A machining method for a concave-convex gear, concave teeth of the concave-convex gear and convex teeth of a mating gear being continuously formed in a circumferential direction, and the concave teeth meshing with the convex teeth of the mating gear to allow torque transmission to or from the mating gear, wherein
the concave-convex gear is machined from a disc-shaped workpiece,
the concave-convex gear is a gear that rotates about an intersecting axis that intersects with a rotation central axis of the mating gear,
a sectional shape of an outer peripheral surface of each convex tooth of the mating gear in a direction orthogonal to a reference axis of the convex tooth is formed in a circular arc shape,
a relative movement trajectory of each convex tooth of the mating gear with respect to the concave-convex gear at the time when torque is transmitted between the mating gear and the concave-convex gear is expressed by:
a first linear axis along which a reference position of the convex tooth of the mating gear is moved in a direction orthogonal to a plane that is tangent to a concave tooth forming face of the disc-shaped workpiece;
a second linear axis along which the reference position of the convex tooth of the mating gear is moved in a tooth groove direction of a corresponding one of the concave teeth of the concave-convex gear in the plane that is tangent to the concave tooth forming face of the disc-shaped workpiece;
a third linear axis along which the reference position of the convex tooth of the mating gear is moved in a direction orthogonal to the second linear axis in the plane that is tangent to the concave tooth forming face of the disc-shaped workpiece;

a fourth rotation axis along which the reference position of the convex tooth of the mating gear is rotated about the first linear axis;

a fifth rotation axis along which the reference position of the convex tooth of the mating gear is rotated about the third linear axis; and a sixth indexing axis that coincides with a rotation central axis of the concave-convex gear and that indexes a rotation phase of the concave-convex gear, the machining method characterized by comprising:

calculating the relative movement trajectory of each convex tooth of the mating gear, expressed by the first linear axis, the second linear axis, the third linear axis, the fifth rotation axis and the sixth indexing axis when the fourth rotation axis is brought into coincidence with the sixth indexing axis; and moving at least one of the disc-shaped workpiece and a working tool on the basis of the calculated relative movement trajectory.

2. The machining method for a concave-convex gear according to claim 1, wherein the number of the convex teeth of the mating gear is different from the number of the concave teeth of the concave-convex gear.

3. The machining method for a concave-convex gear according to claim 1, further comprising:

calculating the relative movement trajectory of each convex tooth of the mating gear, expressed by the first linear axis, the third linear axis, the fifth rotation axis and the sixth indexing axis when movement of the reference position of the convex tooth of the mating gear along the second linear axis is assumed to be performed along the third linear axis in the case where it is presumed that a tooth length of the convex tooth is infinite; and moving at least one of the disc-shaped workpiece and the working tool on the basis of the calculated relative movement trajectory.

4. The machining method for a concave-convex gear according to claim 1, further comprising:

calculating the relative movement trajectory of each convex tooth of the mating gear, expressed by the first linear axis, the second linear axis, the fifth rotation axis and the sixth indexing axis when movement of the reference position of the convex tooth of the mating gear along the third linear axis is assumed to be performed along the second linear axis in the case where it is presumed that a tooth length of the convex tooth of the mating gear is infinite; and moving at least one of the disc-shaped workpiece and the working tool on the basis of the calculated relative movement trajectory.

5. The machining method for a concave-convex gear according to claim 1, further comprising:

calculating the relative movement trajectory of each convex tooth of the mating gear, expressed by the first linear axis, the second linear axis, the third linear axis and the sixth indexing axis, by decomposing movement of the reference position of the convex tooth of the mating gear around the fifth rotation axis into movement of the first linear axis and movement of the second linear axis; and moving at least one of the disc-shaped workpiece and the working tool on the basis of the calculated relative movement trajectory.

\* \* \* \* \*